US011865906B2

(12) United States Patent
Scammell

(10) Patent No.: US 11,865,906 B2
(45) Date of Patent: Jan. 9, 2024

(54) INTEGRATED BED OPTIMIZATION SYSTEM

(71) Applicant: Oliver Scammell, Mililani, HI (US)

(72) Inventor: Oliver Scammell, Mililani, HI (US)

(73) Assignee: Oliver Scammell, Honolulu, HI (US)

( * ) Notice: Subject to any disclaimer, the term of this patent is extended or adjusted under 35 U.S.C. 154(b) by 0 days.

(21) Appl. No.: 17/505,444

(22) Filed: Oct. 19, 2021

(65) Prior Publication Data

US 2023/0123716 A1   Apr. 20, 2023

(51) Int. Cl.
*B60J 7/16* (2006.01)
*B60R 9/045* (2006.01)

(52) U.S. Cl.
CPC ............. *B60J 7/1614* (2013.01); *B60R 9/045* (2013.01)

(58) Field of Classification Search
CPC ............................... B60J 7/1614; B60R 9/065
USPC ...... 296/10, 100.02, 100.01, 100.17, 100.18, 296/102, 26.04, 26.05; 224/320, 328, 403
See application file for complete search history.

(56) References Cited

U.S. PATENT DOCUMENTS

| | | | | |
|---|---|---|---|---|
| 4,220,370 A | * | 9/1980 | Rice | B60P 3/34 296/165 |
| 4,328,989 A | * | 5/1982 | Childers | B60P 3/32 296/26.05 |
| 7,530,614 B2 | * | 5/2009 | Nichols | B60P 7/0815 296/3 |
| 8,186,739 B2 | * | 5/2012 | Bruestle | B60J 7/1614 296/100.01 |
| 2008/0179911 A1 | * | 7/2008 | Spencer | B60J 7/085 296/100.17 |
| 2017/0057425 A1 | * | 3/2017 | Pulleyblank | B60R 13/01 |
| 2019/0061497 A1 | * | 2/2019 | Trinier | B60J 7/198 |
| 2019/0359041 A1 | * | 11/2019 | Sullivan | B60J 7/12 |
| 2021/0213812 A1 | * | 7/2021 | Schollhammer | B60J 7/068 |
| 2021/0229537 A1 | * | 7/2021 | Piche | B60P 7/02 |

FOREIGN PATENT DOCUMENTS

| | | | | |
|---|---|---|---|---|
| DE | 102015117257 A1 | * | 4/2017 | |
| WO | WO-2007050389 A1 | * | 5/2007 | ............ B60J 7/1614 |

* cited by examiner

*Primary Examiner* — Amy R Weisberg
*Assistant Examiner* — Kevin P Weldon
(74) *Attorney, Agent, or Firm* — Shay Glenn LLP

(57) ABSTRACT

An integrated bed optimization system comprises a dynamic frame which is integrated into the front and sides of a pickup truck bed. The frame can be raised and lowered to expand the bed's usable volume and to optimize cargo storage options. The frame comprises T-Track beams which permit the user to customize the bed by allowing the user to secure one or more attachments to the frame. The attachments can include tiedown points, storage racks, tonneau covers, camper shells, and other modular accessories.

22 Claims, 31 Drawing Sheets

100

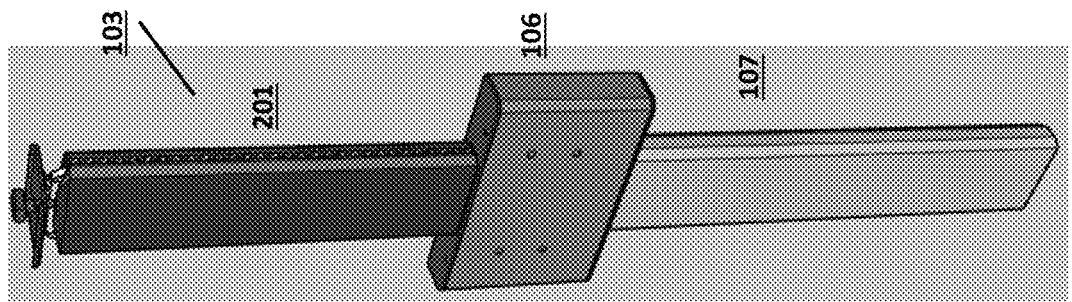
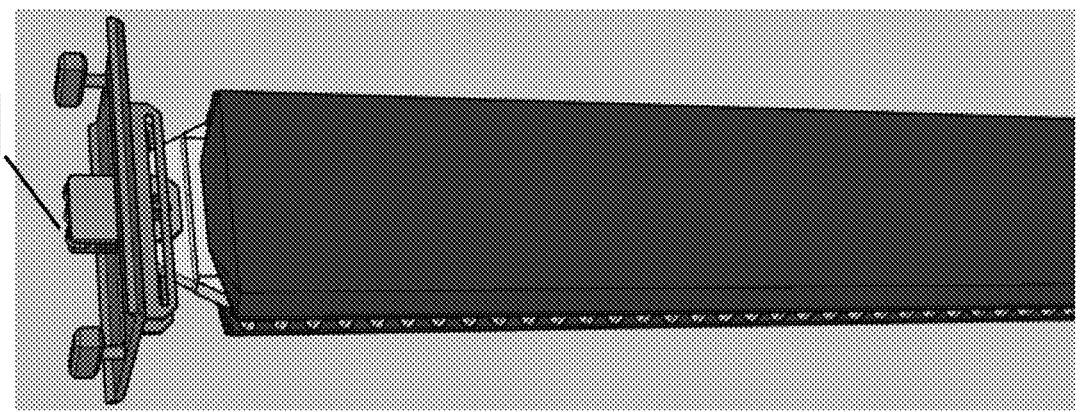
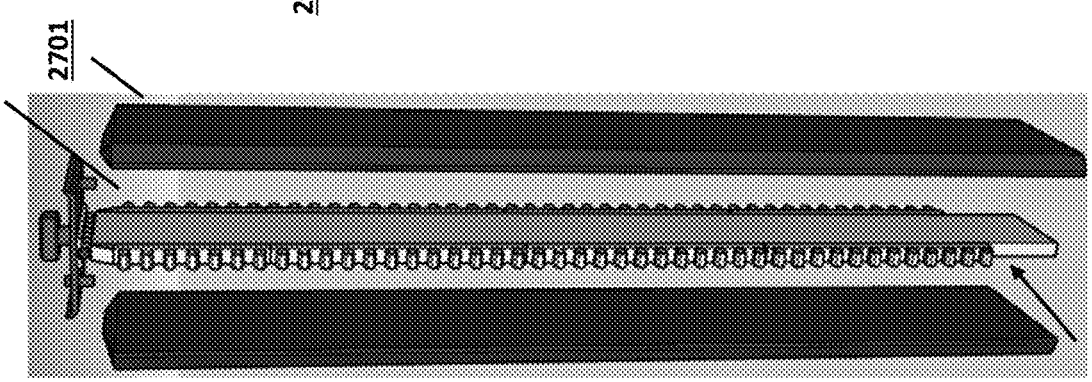
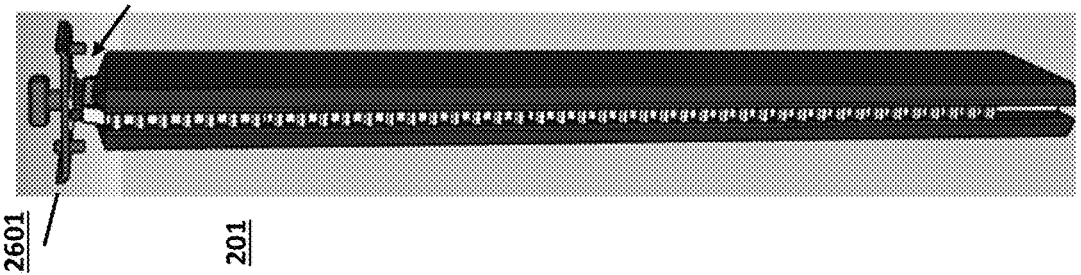

106

106

INTEGRATED BED OPTIMIZATION SYSTEM

FIELD OF THE INVENTION

An integrated bed optimization system for use in the bed of a pickup truck is disclosed.

BACKGROUND OF THE INVENTION

Pickup trucks are ubiquitous. People use pickup trucks to haul a wide variety of objects of different sizes and weights. The prior art includes fixed racks that can be installed in the bed of a pickup truck to provide addition storage space and configurations for securing objects during transport.

A drawback in the prior art is that these racks are fixed structures. The racks lack the ability to expand or contract in size. Moreover, it can be very strenuous for a user to load a heavy or cumbersome object, such as an ocean kayak or large pipe, onto the rack, as the rack often will be six feet or more from the ground.

What is needed is an improved storage system for the bed of a pickup truck that overcomes these drawbacks.

SUMMARY OF THE INVENTION

An integrated bed optimization system comprises a dynamic frame which is integrated into the front and sides of a pickup truck bed. The frame can be raised and lowered to expand the bed's usable volume and to optimize cargo storage options. The frame comprises T-Track beams which permit the user to customize the bed by allowing the user to secure one or more attachments to the frame. The attachments include tiedown points, storage racks, tonneau covers, camper shells, and other modular accessories.

BRIEF DESCRIPTION OF THE DRAWINGS

FIG. 26 depicts a front vertical support pillar with a mounting plate and hinge.

FIG. 27 shows an exploded view of a front vertical support pillar.

FIG. 28 depicts a side vertical support pillar.

FIG. 29 depicts a front vertical support structure.

DETAILED DESCRIPTION OF THE INVENTION

FIGS. 1-40 depict various embodiments of an integrated bed optimization system.

Figure 1:
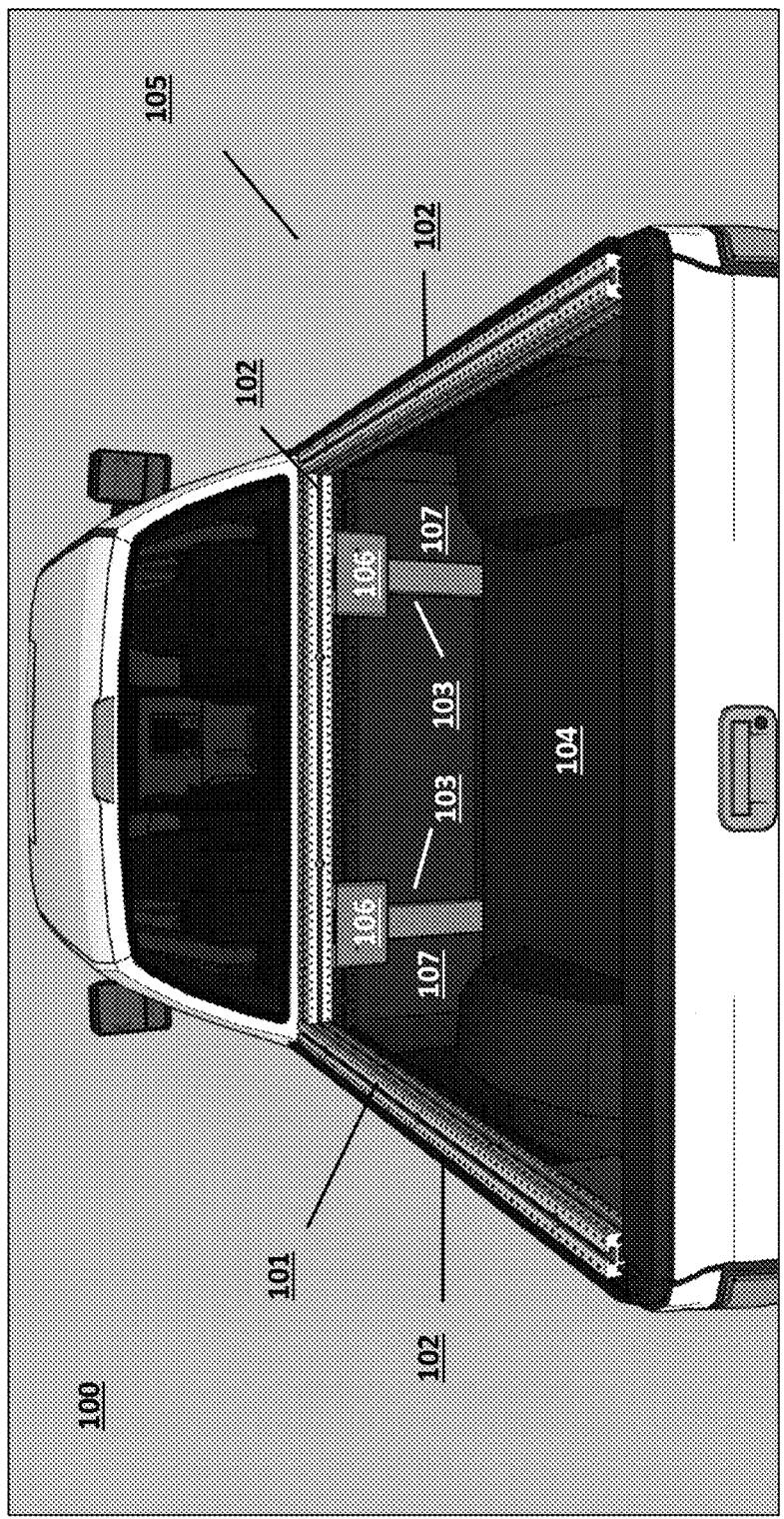
FIG. 1 depicts an embodiment of an integrated bed optimization system in a retracted position.

FIG. 1 depicts integrated bed optimization system 100. Integrated bed optimization system 100 comprises frame 101 and vertical support structures 103. Frame 101 comprises beams 102. In the example shown, frame 101 comprises three beams 102 arranged in a U-formation. Frame 101 is attached to vertical support structures 103, which are attached to truck bed 104 of pickup truck 105.

Each vertical support structure 103 comprises motor unit 106 and support sleeve 107. Motor unit 106 provides force to extend frame 101 away from truck bed 104 or to retract frame 101 toward truck bed 104. Support sleeve 107 provides support for vertical pillar 201 (shown in FIG. 2) and acts as a sheath for vertical pillar 201 when frame 101 is retracted. Integrated bed optimization system 100 here is shown in a retracted position within truck bed 104.

Figure 2:
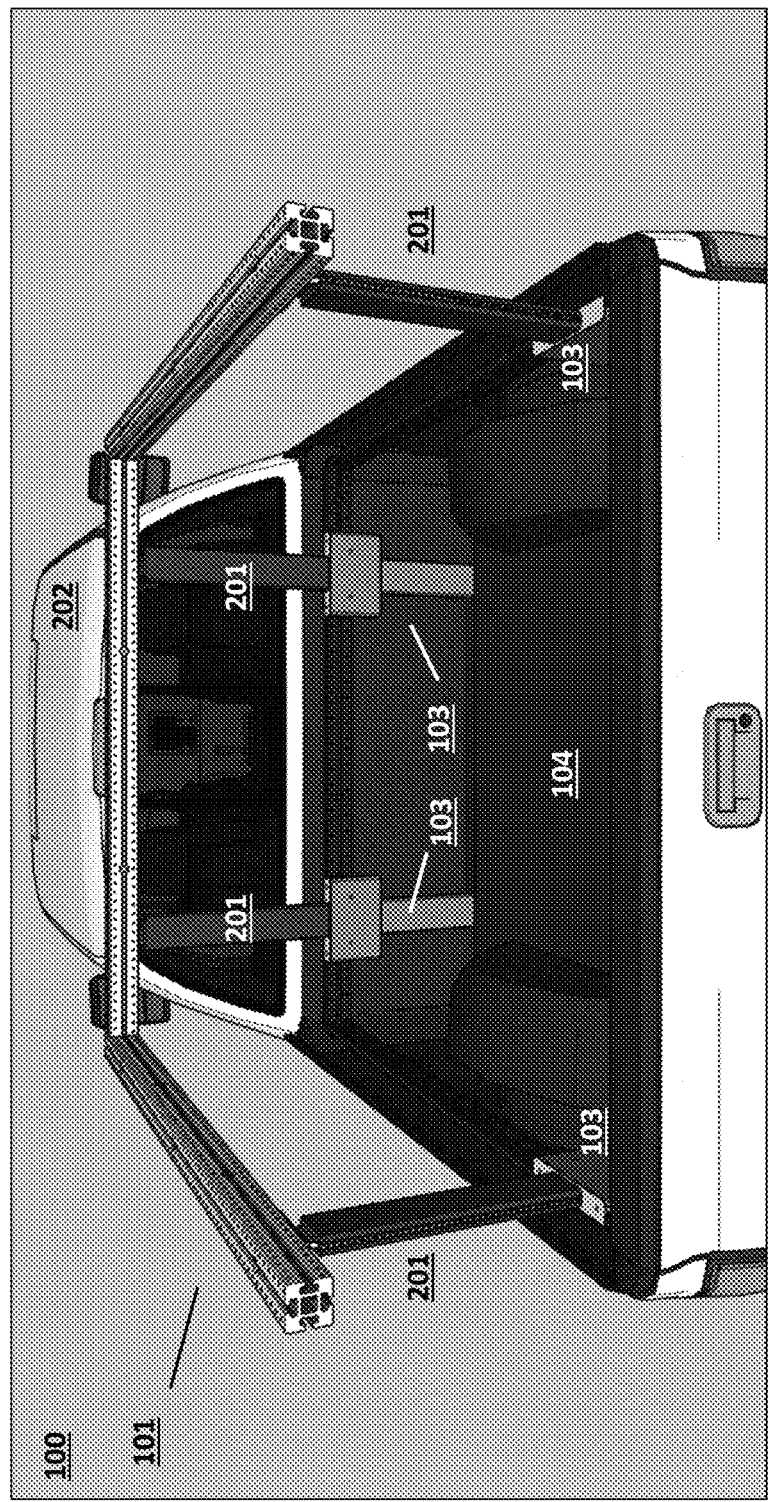
FIG. 2 depicts an embodiment of an integrated bed optimization system in an extended position.

FIG. 2 depicts integrated bed optimization system 100 in an extended position within truck bed 104. Frame 101 is elevated through the extension of vertical pillars 201 by motor units 106 within vertical support structures 103. Frame 101 can be lifted to a level above the pickup truck cab 202 which permits large items to be stored on top of frame 101 such that the objects can extend over cab 202.

Figure 4:
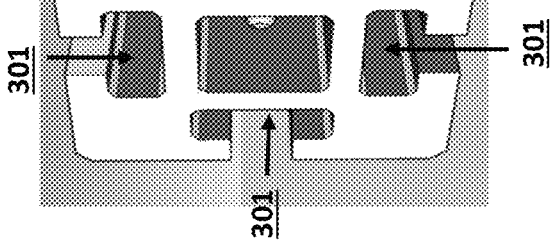
FIG. 4 depicts an angled view of a beam used in an integrated bed optimization system.
Figure 3:
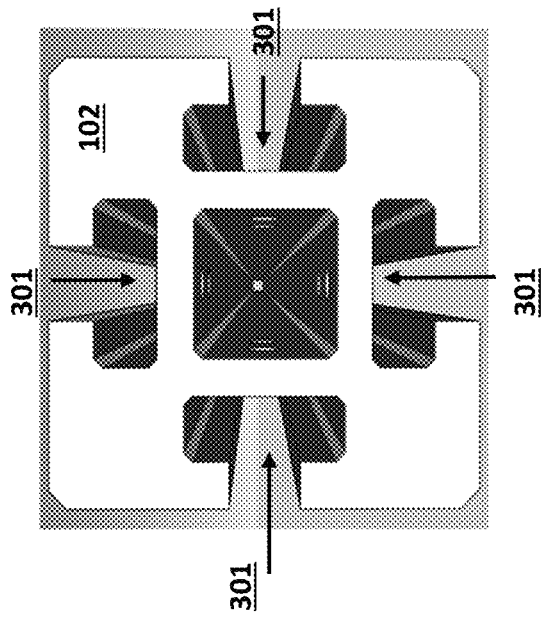
FIG. 3 depicts a cross-section of a beam used in an integrated bed optimization system.

FIGS. 3 and 4 depict exemplary beams 102 that can be used in frame 101. FIG. 3 depicts a cross-section of beam 102, and FIG. 4 depicts an angled view of beam 102. In the example shown in FIGS. 3 and 4, beam 102 is a Quad T-Track beam comprising T-Track mounting slots 301 on four sides. Each T-Track mounting slot 301 can receive an attachment with a T-shaped connector that is sized to fit within T-Track mounting slot.

In this embodiment, each beam 102 measures three inches high and three inches wide, and has a length that is customizable to fit the dimensions of pickup truck bed 102. Preferably, beam 102 is constructed from a strong and rigid material such as steel. Beam 102 is shown with T-tracks, but other known fastening mechanisms could be used instead. Beam 102 is shown with T-tracks on four sides, but it instead could be constructed with T-tracks on fewer than all four sides.

Figure 6:
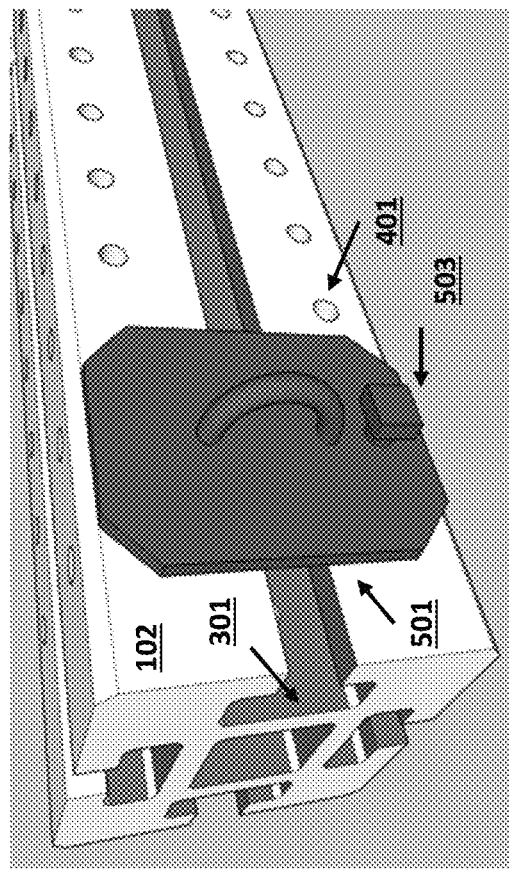
FIG. 6 depicts another view of the tiedown structure in an integrated bed optimization system.
Figure 34:
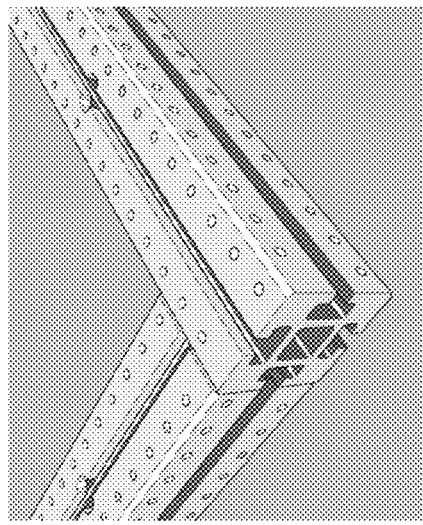
FIGS. 34-36 depict two beams and a lug during the connection process.
Figure 35:
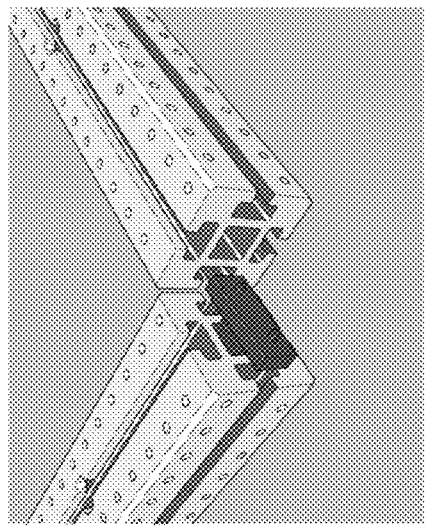

Optionally, beams 102 comprise holes 401 within one or more T-Track mounting slots 301, or one the exterior of T-Track mounting slits 301, to permit attachments to be secured to beam 102 using locking pins (shown in FIGS. 6 and 34-35).

Various attachments will now be described that can be secured to frame 101.

Tiedown Attachment

Figure 5:
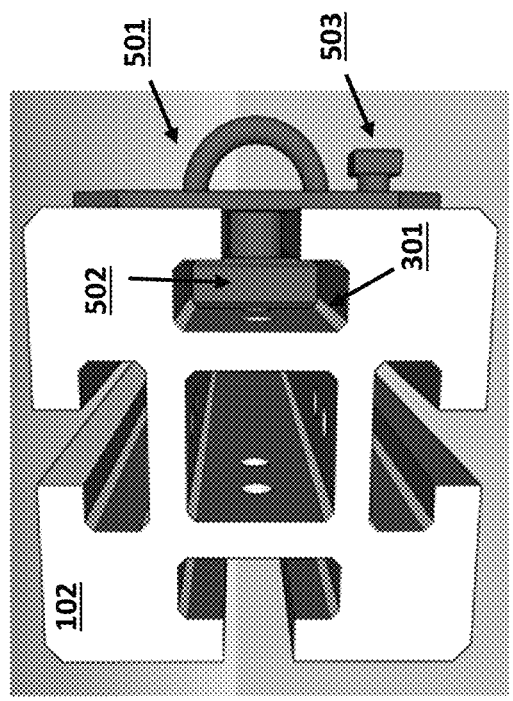
FIG. 5 depicts a tiedown structure in an integrated bed optimization system.

FIGS. 5 and 6 depict tiedown attachment 501 secured to a T-Track mounting slot 301. Tiedown attachment 501 comprises male T-lug 502 (which is sized to fit within T-Track mounting slot 301) and locking pin 503. T-lug 502 can slide into T-Track mounting slot 302 from an end of beam 102 or at designated cut out spots along the length of beam 102. Locking pin 503 inserts into one of the holes 401 to secure tiedown attachment 501 in place along beam 102.

Rail Top Covers

Figure 7:
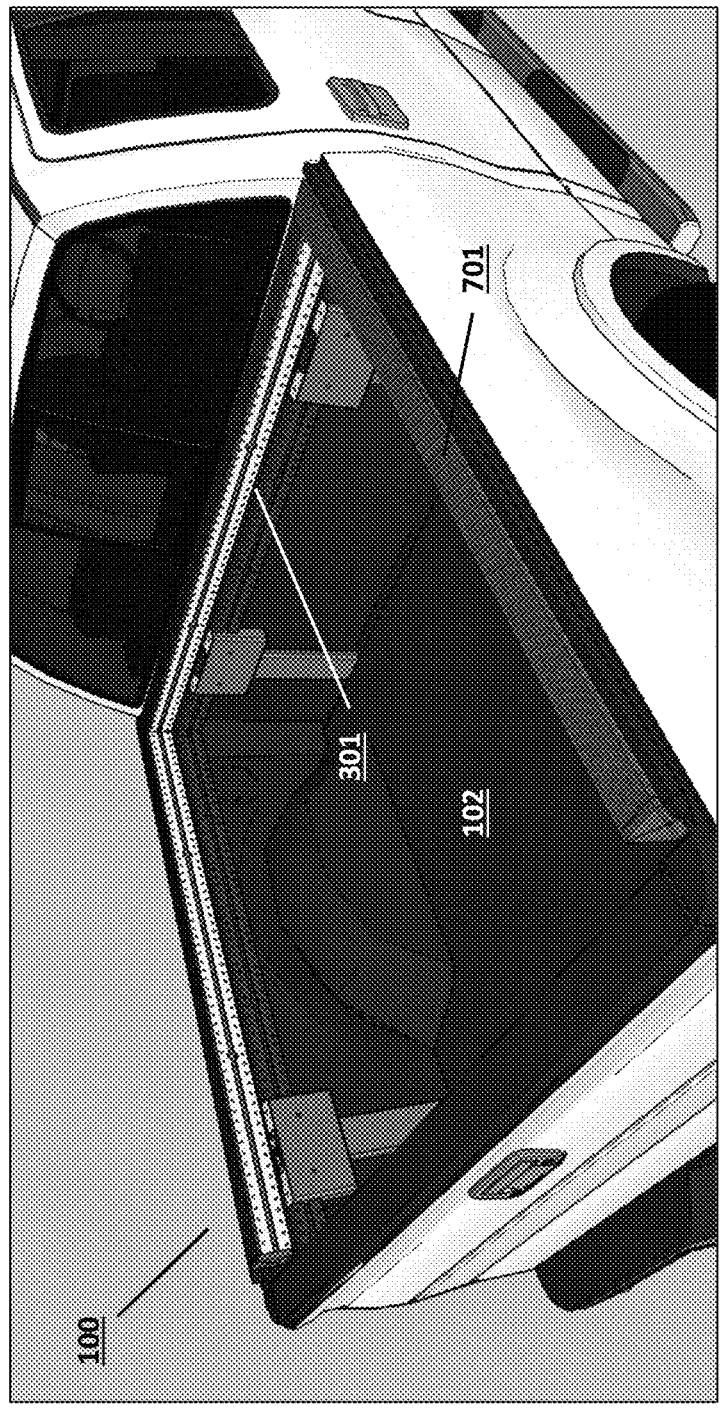
FIG. 7 depicts an integrated bed optimization system with rail top covers, in a retracted position.

FIG. 7 depicts integrated bed optimization system 100 with rail top covers 701 installed to protect the top side of beams 102 from damage. Rail top covers 701 can be produced in a variety of colors and styles to allow the customer to select one that meets their practical needs and aesthetic preferences. Optionally, rail top covers 701 can be constructed with a high coefficient of friction on the top side to minimize the movement of objects that are placed in contact with rail top covers 701 during transport.

Figure 8:
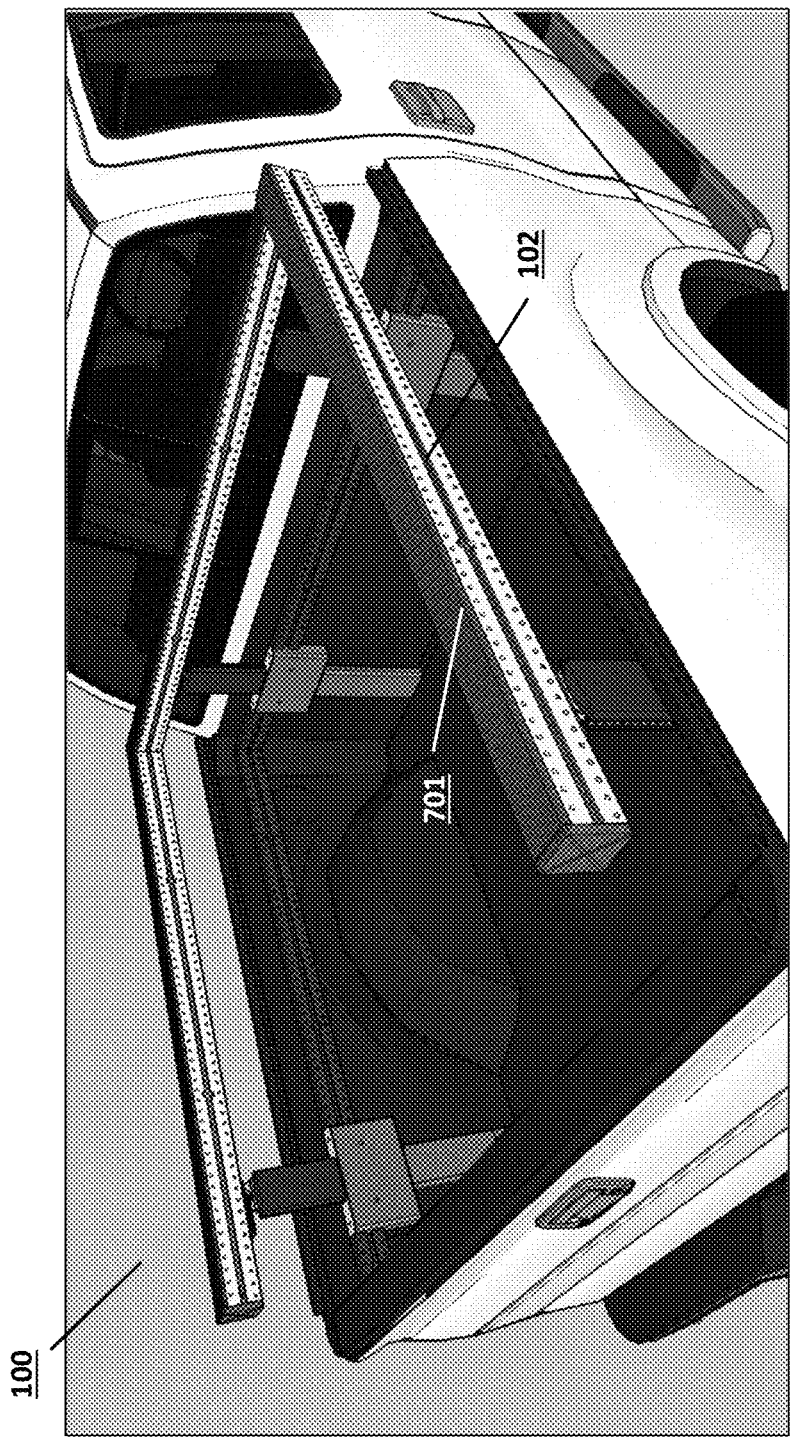
FIG. 8 depicts an integrated bed optimization system with rail top covers, in an extended position.

FIG. 8 depicts integrated bed optimization system 100 in a partially elevated position, with rail top covers 701 installed on beams 102.

Tonneau Cover Attachment

Figure 9:
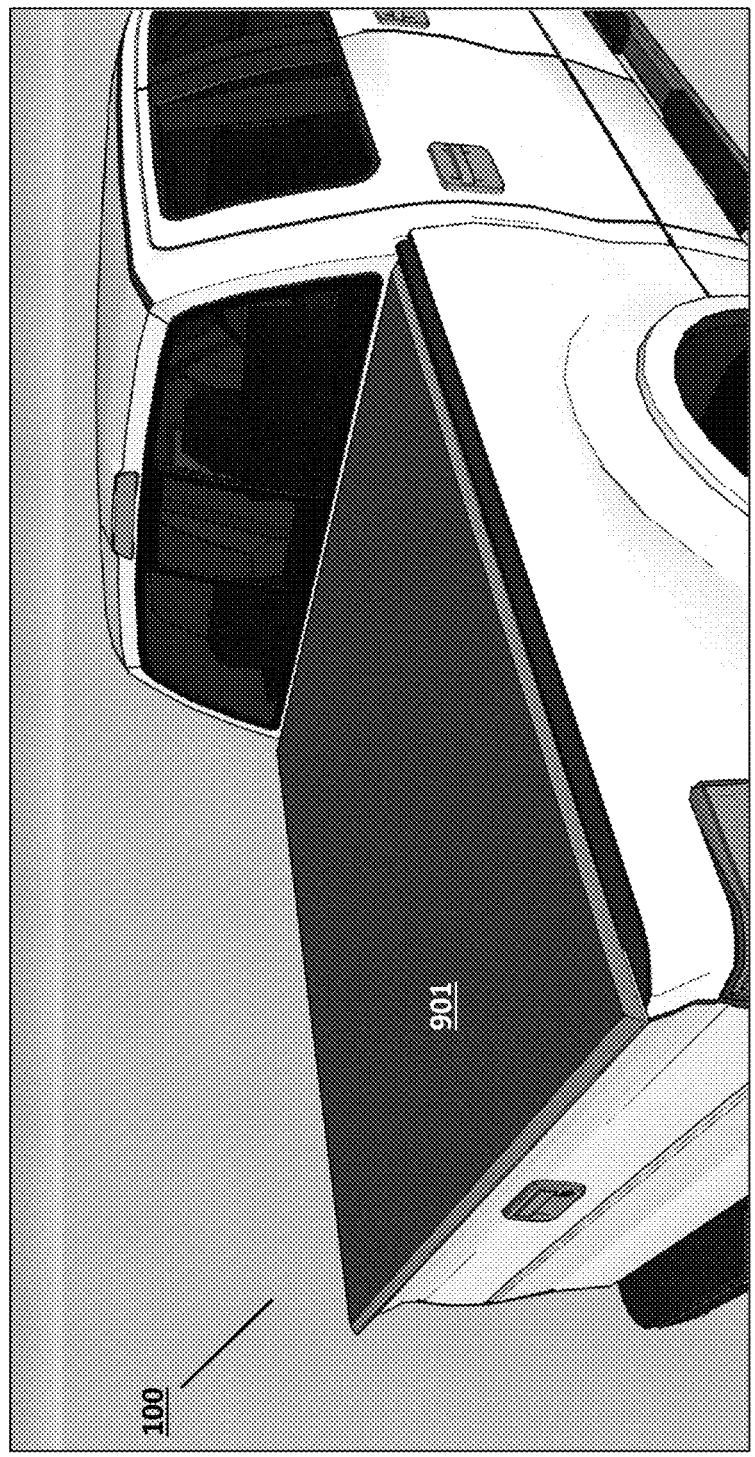
FIG. 9 depicts an integrated bed optimization system with a tonneau cover, in a retracted position.

FIG. 9 depicts integrated bed optimization system 100 with tonneau cover 901 mounted on top of frame 101 using T-Track connector plates (not shown). This pairing optimizes the function and performance of tonneau cover 901 by permitting it to be raised to accommodate oversized items that are too large to fit under a traditionally mounted tonneau cover.

Figure 10:
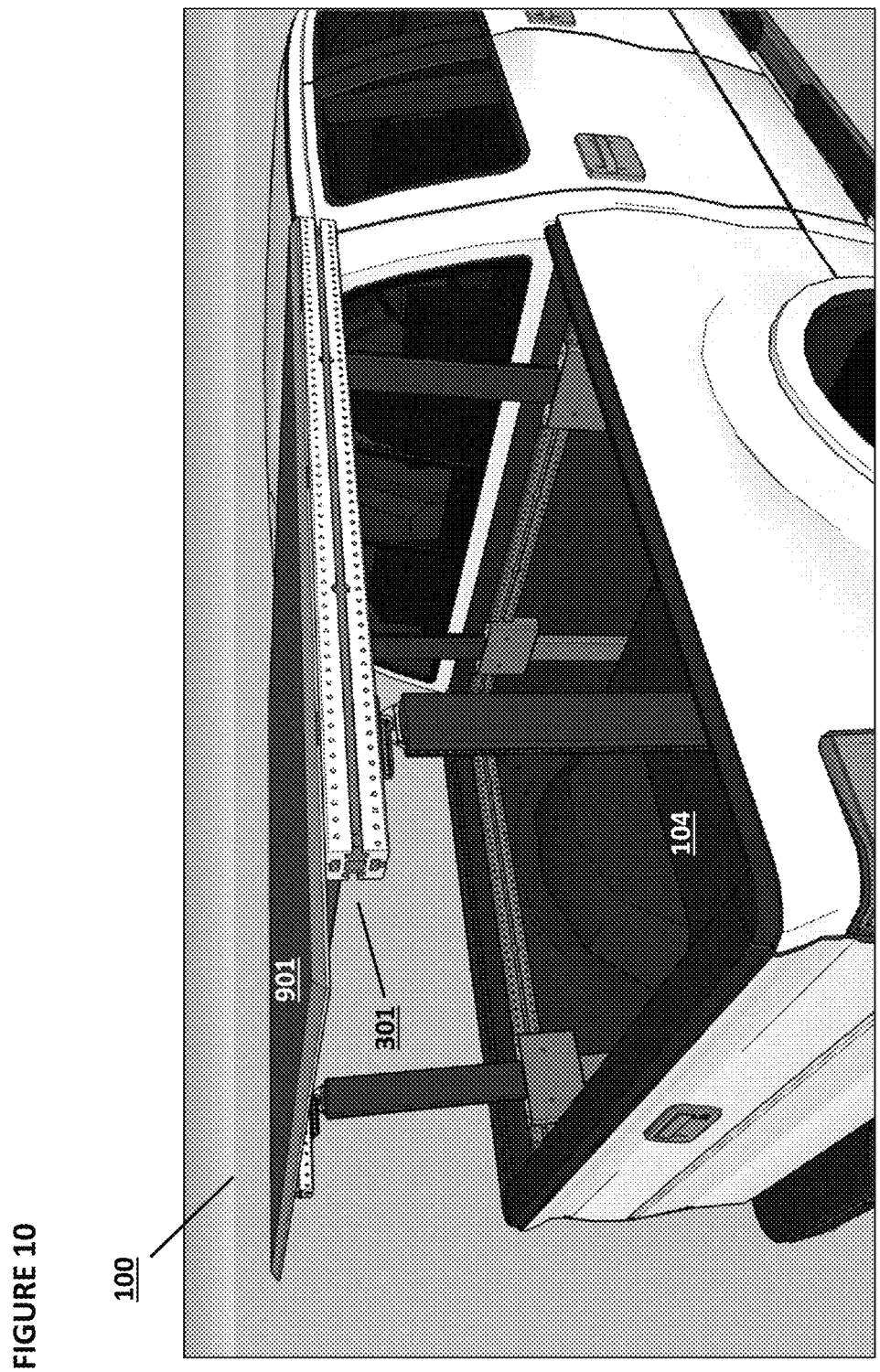
FIG. 10 depicts an integrated bed optimization system with a tonneau cover, in a fully elevated position.

FIG. 10 depicts integrated bed optimization system 100 in a fully elevated position, with tonneau cover 901 mounted to frame 101. The ability to elevate tonneau cover 901 provides greater protection for bulky cargo items than a retractable or folding tonneau cover which leaves the items fully exposed to the elements and makes them an easy target for thieves. This arrangement also permits the user improved access to all sides of the pickup truck bed which enhances the ergonomics and efficiency of the loading/unloading process.

One of ordinary skill in the art will appreciate that integrated bed optimization system 100 significantly expands the usable storage space in pickup truck bed 104 compared with traditionally-mounted tonneau covers in pickup trucks without integrated bed optimization system 100. Once cargo is loaded into truck bed 104, tonneau cover 901 and frame 101 can be lowered to help secure the load in place while also providing some protection from the elements and theft.

Alternatively, a cargo net can be installed in place of tonneau cover 901.

Figure 11:
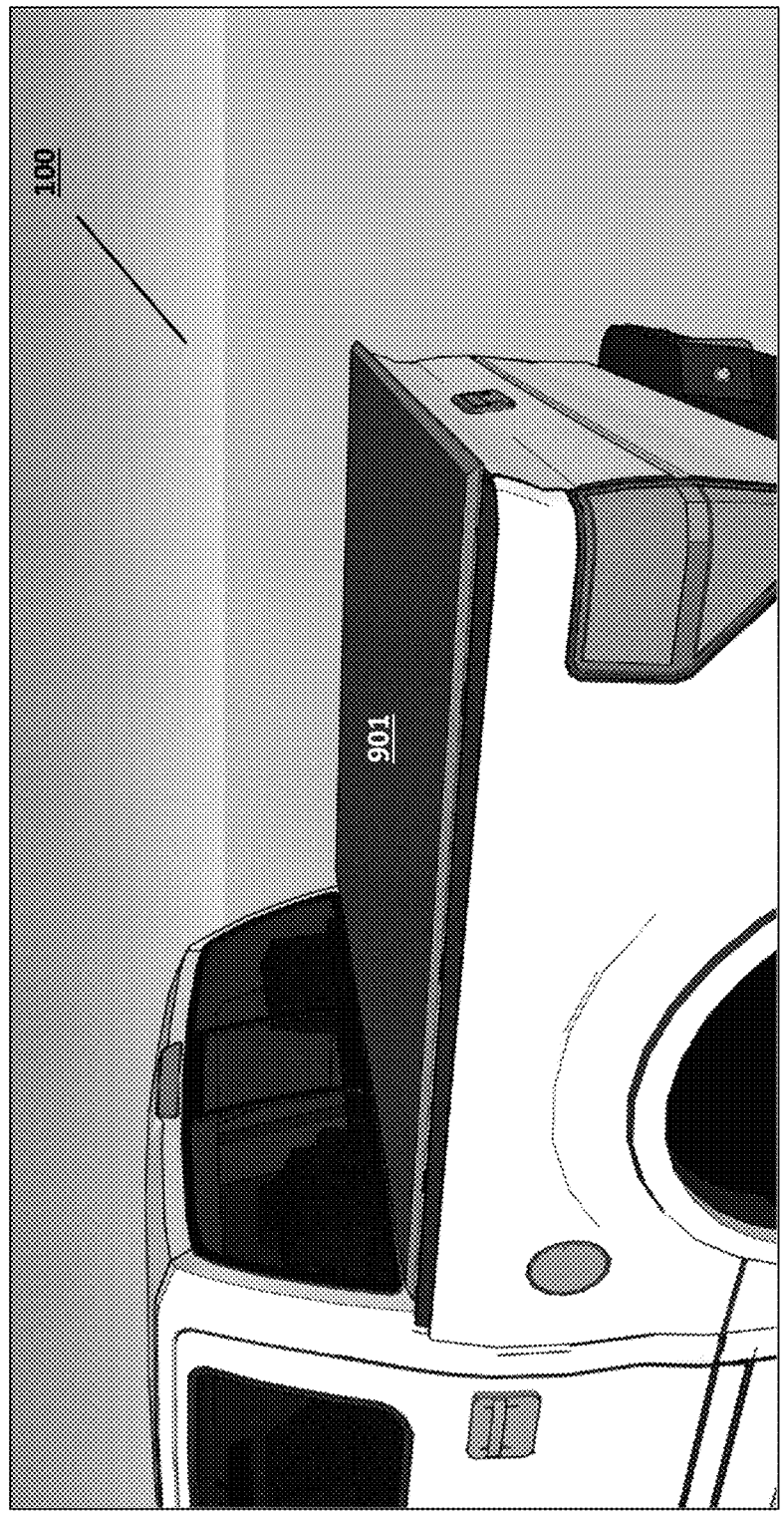
FIG. 11 depicts an integrated bed optimization system with a tonneau cover and side skirts, in a retracted position.
Figure 12:
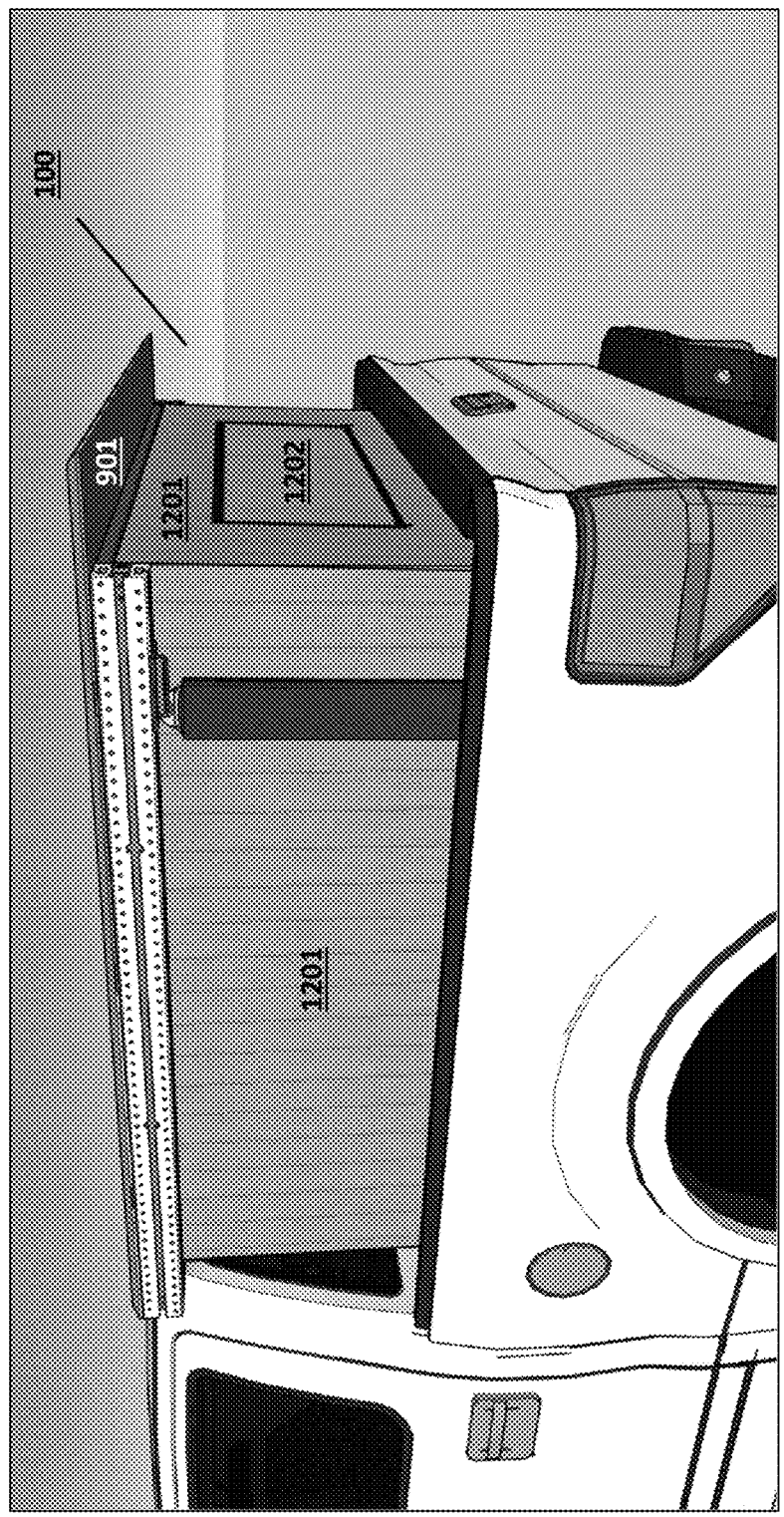
FIG. 12 depicts an integrated bed optimization system with a tonneau cover and side skirts, in a fully elevated position.
Figure 13:
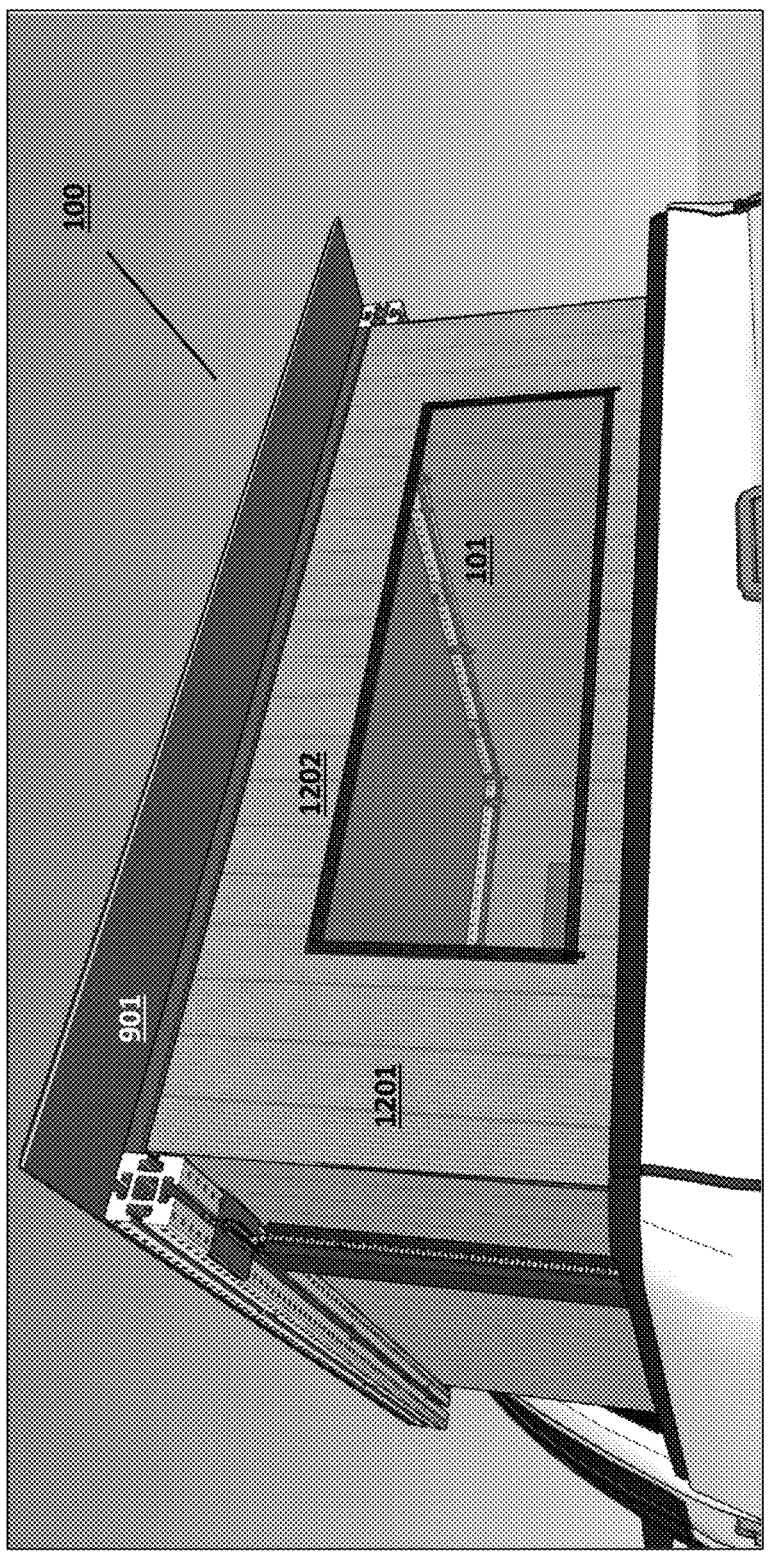
FIG. 13 depicts another view of an integrated bed optimization system with a tonneau cover and side skirts, in a fully elevated position.

With reference to FIGS. 11-13, integrated bed optimization system 100 again comprises a tonneau cover 901 and is further enhanced by the addition of side skirts 1201. The top of side skirts 1201 are connected to T-Track mounting slots 301 in frame 101, and the bottom of side skirts 1201 are connected to T-track support structure 3701 (shown in FIG. 37) that is attached directly to pickup truck bed 104.

The strong yet flexible side skirts 1201 collapse when frame 101 is lowered and expand as frame 101 is elevated. This setup almost doubles the usable volume of pickup truck bed 104 and protects the cargo from the elements and theft from all angles.

FIG. 11 depicts integrated bed optimization system 100 with tonneau cover 901 and side skirts 1201, in a retracted position. FIGS. 12 and 13 depict integrated bed optimization system 100 with tonneau cover 901 and side skirts 1201, in an elevated position.

Optionally, side skirts 1201 can include clear plastic windows 1202 at the front and rear faces of the skirt and a large, zipped access point on the rear side of the skirt. FIG. 13 depicts this option from the rear of the vehicle. In FIG. 13, T-Track attachment points which connect tonneau cover 901 and side skirts 1201 to frame 101 are visible through window 1202.

Camper Shell Attachment

Figure 14:
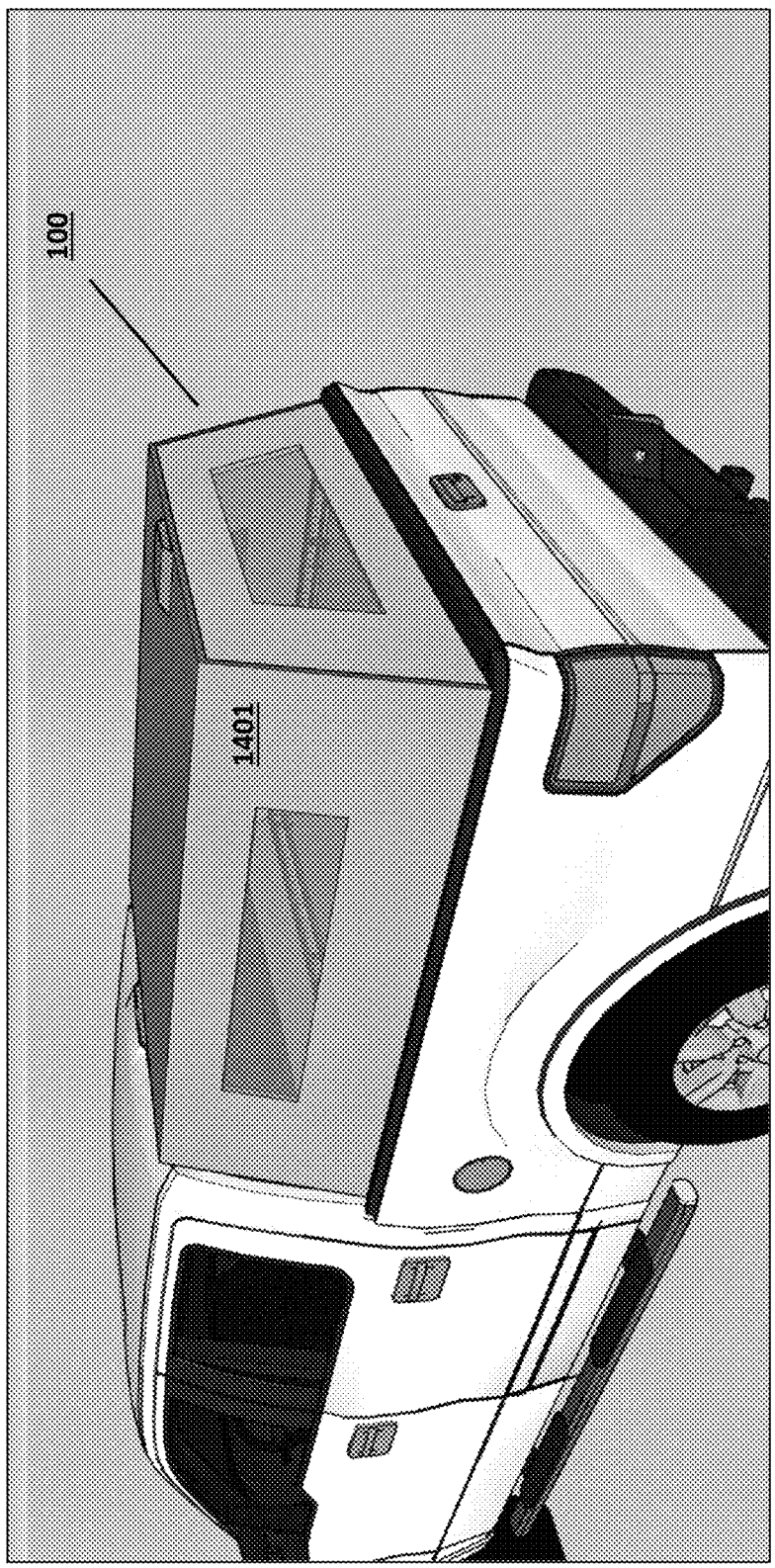
FIG. 14 depicts an integrated bed optimization system with a camper shell and side skirts, in a retracted position.
Figure 15:
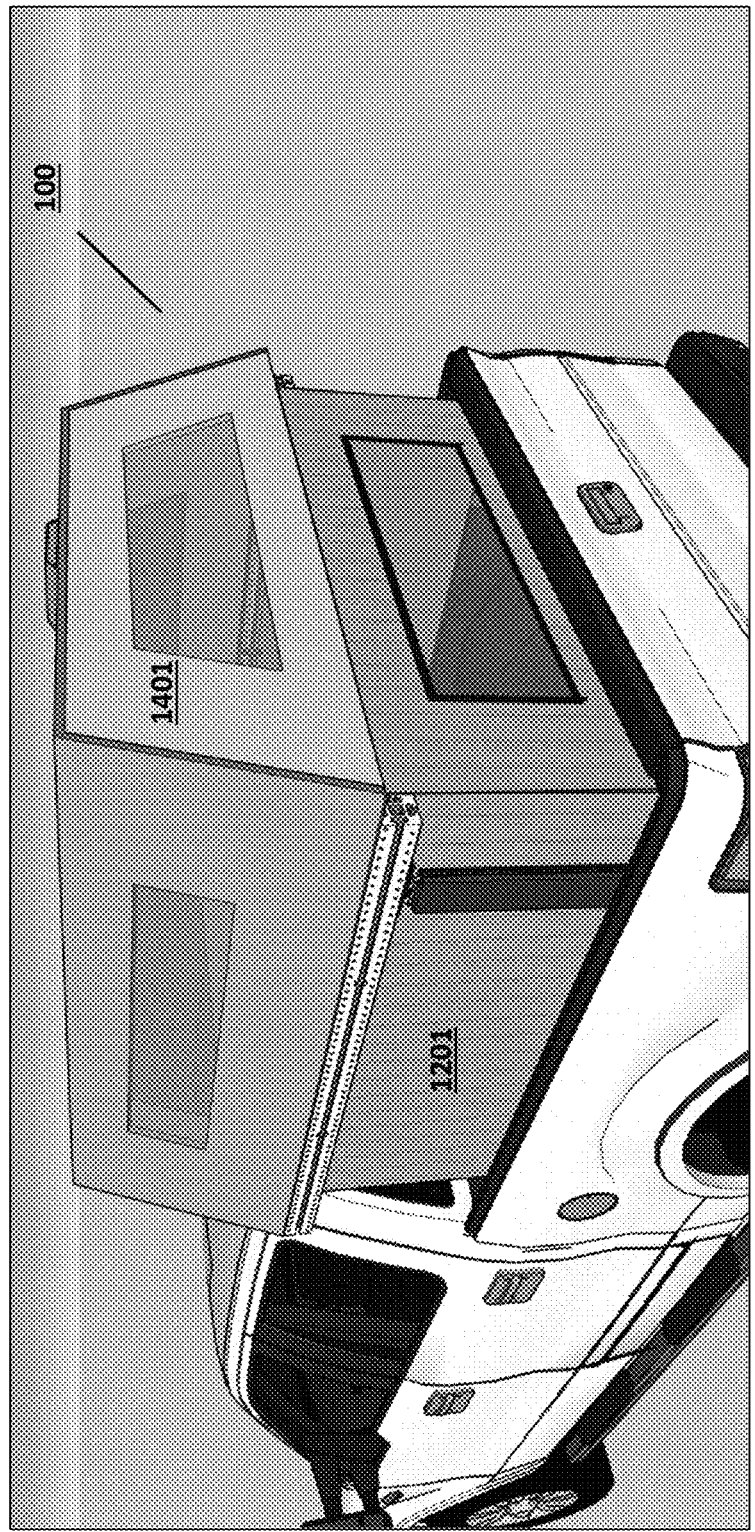
FIG. 15 depicts an integrated bed optimization system with a camper shell and side skirts, in a fully elevated position.

With reference to FIGS. 14 and 15, camper shell 1401 can be mounted to frame 101 using the T-Tracks in beams 102. Similar to the use of tonneau cover 901, the use of camper shell 1401 is advantageous because it permits camper shell 1401 to be raised and lowered to expand the usable pickup truck bed volume. FIG. 14 depicts a pickup truck integrated bed optimization system 100 with camper shell 1401, in a retracted position.

Optionally, side skirts 1201 can be added to frame 101 in conjunction with camper shell 1401. FIG. 15 depicts integrated bed optimization system 100 with camper shell 1401 and side skirt 1201, in a fully elevated position. This almost triples the usable volume of the pickup truck bed while protecting cargo from the elements and theft.

Other Attachments and Configurations

Other attachments and configurations for integrated bed optimization system 100 will now be described.

Figure 16:
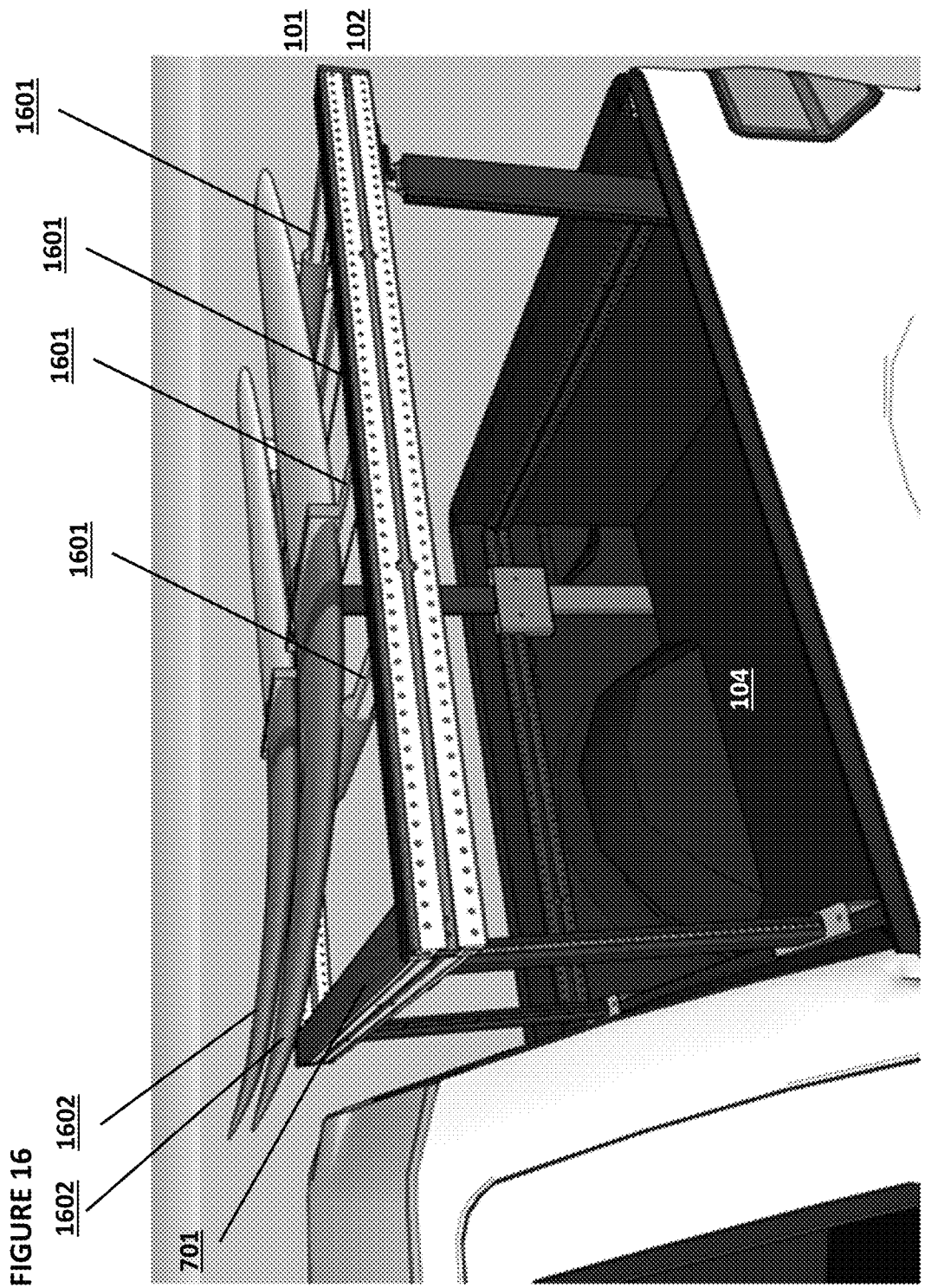
FIG. 16 depicts an integrated bed optimization system with rail top covers and mid-mount crossbars.

FIG. 16 depicts frame 101 with rail top covers 701 and mid-mount crossbars 1601. Mid-mount crossbars 1601 are mounted to T-Tracks of beams 102 on both sides of pickup truck bed 104. This configuration allows a user to secure long items on top of frame 101. Here, two surfboards 1602 are secured across frame 101 using mid-mount crossbars 1601 for support.

In the embodiments described thus far, vertical pillars 201 were depicted as moving upward or downward in unison.

However, integrated bed optimization system 100 also allows for each vertical pillar 201 to be controlled and moved independently.

Figure 17:
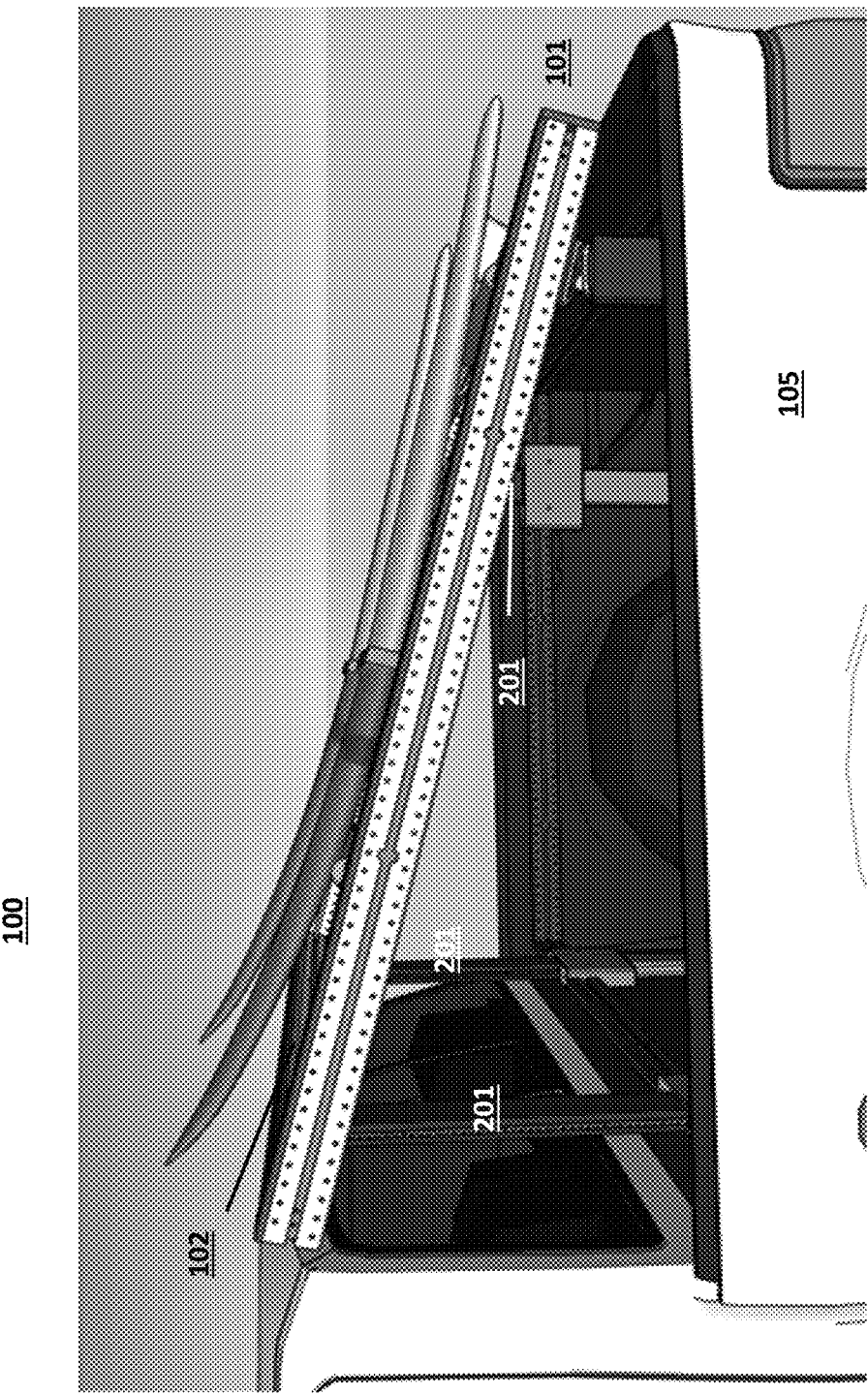
FIG. 17 depicts an integrated bed optimization system with the front vertical pillars extended and the side vertical pillars partially or fully retracted.

For example, as shown in FIG. 17, in certain situations it may be useful for the front vertical pillars 201 (attached to the front of truck bed 104) to remain extended while the side vertical pillars 201 (attached to the sides of truck bed 104) are fully or partially retracted. In FIG. 17, frame 101 pivots on hinges built into the mounts that connect the front vertical pillars 201 to the front beam 102 (discussed in more detail below with reference to FIG. 26). The connection point between each side vertical pillar 201 and the corresponding side beams 102 pivots and slides to permit frame 101 to tilt up to 20 degrees (discussed in more detail below with reference to FIG. 28). In FIG. 17, frame 101 is tilted downward towards the tailgate of truck 105 to permit the user to more easily load items onto frame 102. Optionally, after loading the items, the user can fully extend side vertical pillars 201, after which frame 101 will be fully extended and level as shown in FIG. 16.

Figure 18:
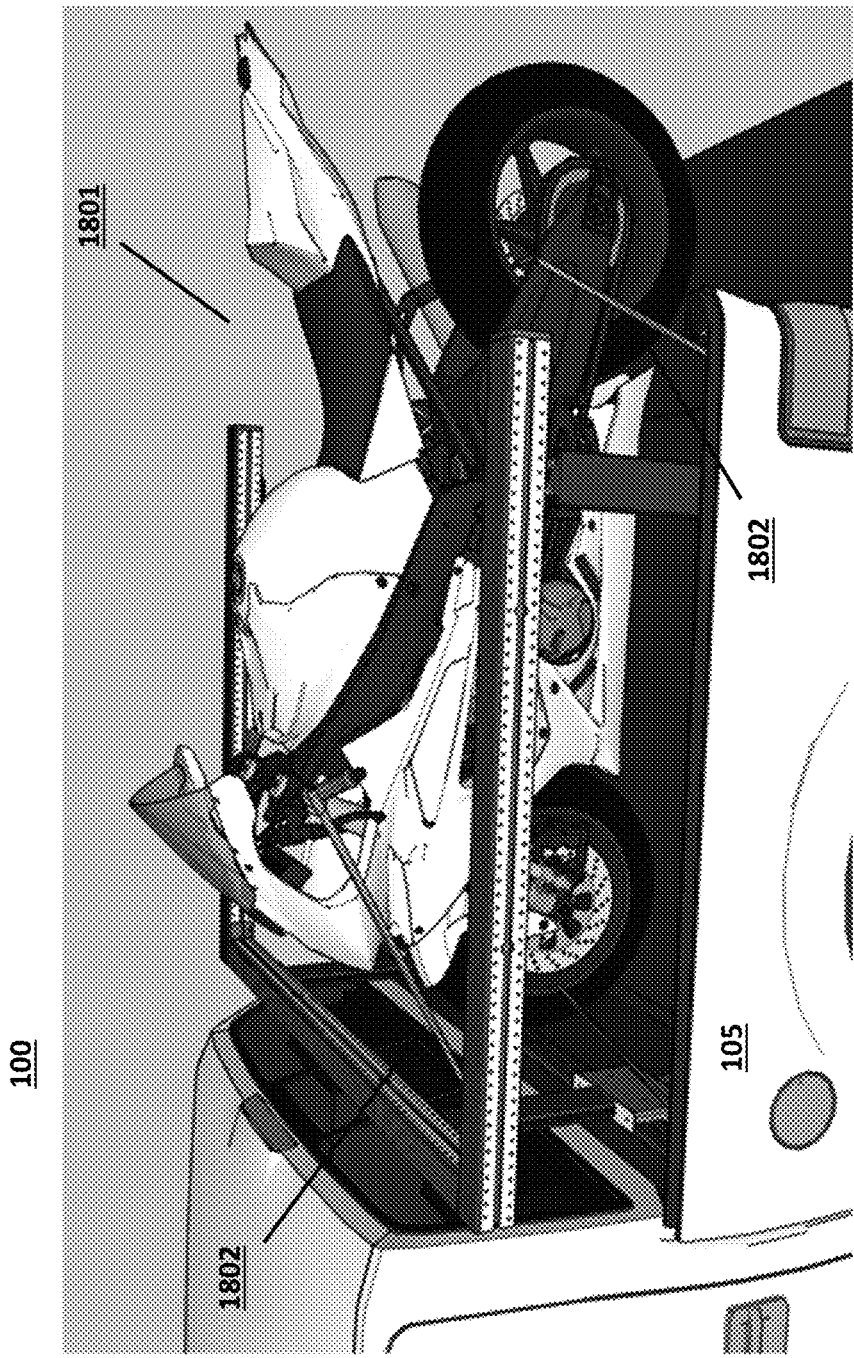
FIG. 18 depicts an integrated bed optimization system with straps secured to tiedown points.
Figure 19:
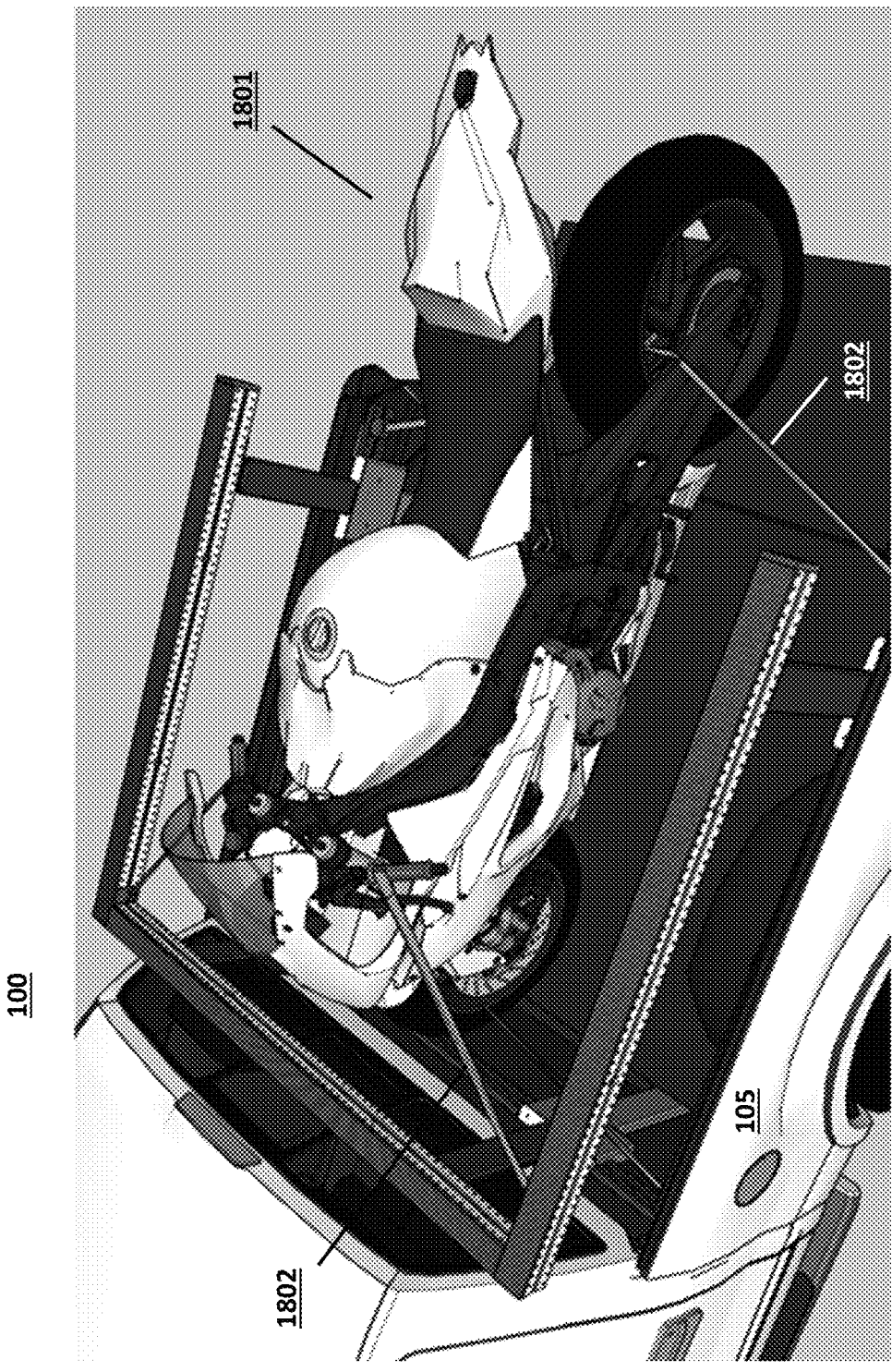
FIG. 19 depicts an integrated bed optimization system with straps secured to tiedown points.

With reference to FIGS. 18 and 19, integrated bed optimization system 100 greatly improves the performance of truck 105 when securing items in pickup truck bed 104 during transport. Integrated bed optimization system 100 accomplishes this by permitting tiedown points to be optimally placed for each item. Not only can tiedown points be added around the entirety of the bed using T-track support structures 3701 (shown in FIG. 37), but frame 101 can be elevated to enable the user to attach tie down straps above or around the item(s) for improved stability.

Thus, in FIGS. 18 and 19, motorcycle 1801 is secured by integrated bed optimization system 100 using straps 1802 secured to tie down points attached to frame 101 and straps 1802 secured to T-track support structures 3701 lining the pickup truck bed 104.

Figure 20:
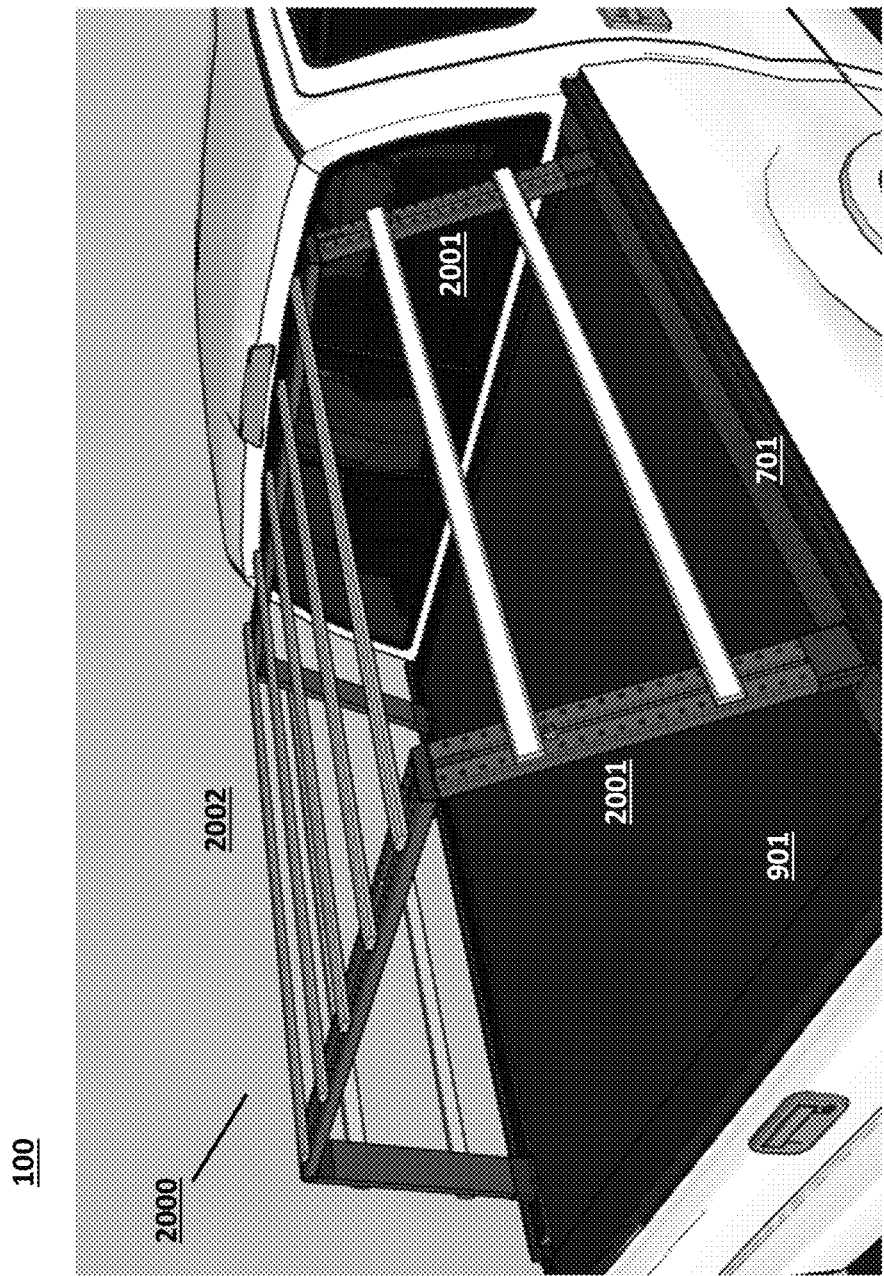
FIG. 20 depicts an integrated bed optimization system with an upper structure, in a retracted position.
Figure 21:
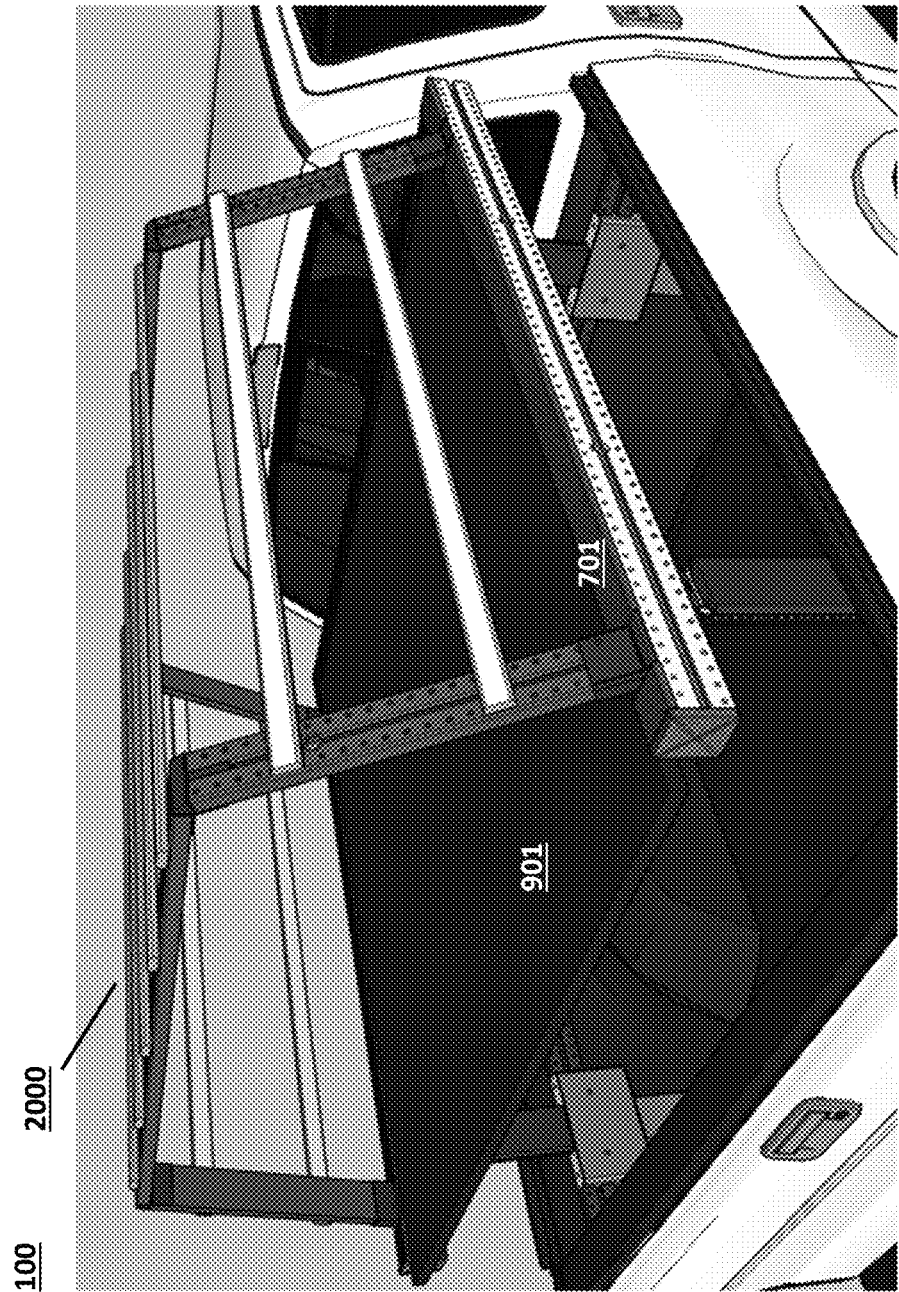
FIG. 21 depicts an integrated bed optimization system with an upper structure, in an extended position.

In FIG. 20, integrated bed optimization system 100 comprises upper structure 2000 mounted to frame 101. Upper structure 2000 comprises A-frames 2001 and longitudinal bars 2002 arranged as shown. A-frames 2001 are constructed from single sided T-Tracks, which permit additional components such as longitudinal bars 2002 to be added. Tonneau 901 and rail top covers 701 also are attached to frame 101. FIG. 20 depicts integrated bed optimization system 100 with upper structure 2000, in a retracted position. FIG. 21 depicts integrated bed optimization system 100 with upper structure 2000, in an extended position.

Figure 22:
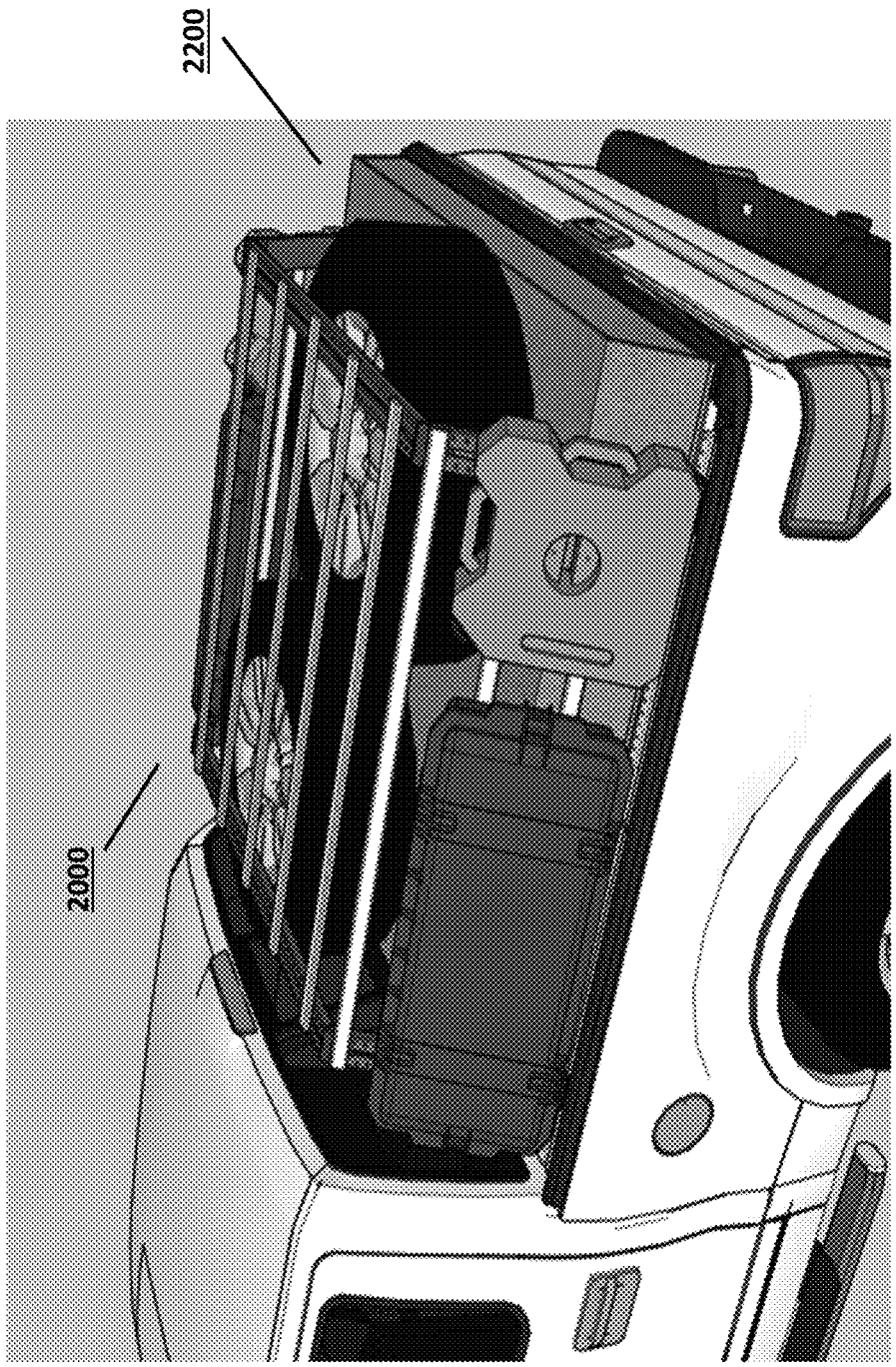
FIG. 22 depicts an integrated bed optimization system with an upper structure and a drawer, in a retracted position.
Figure 23:
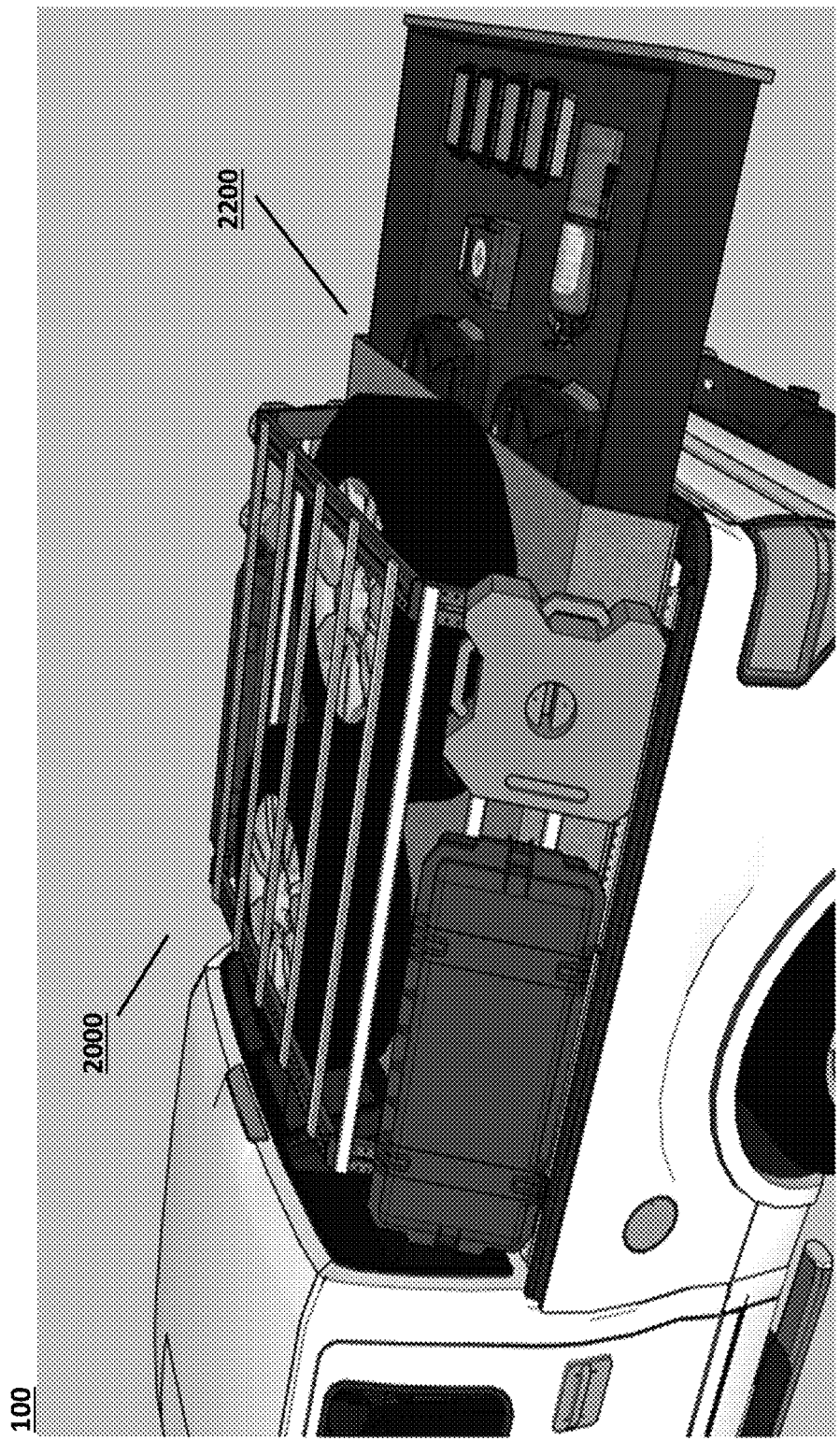
FIG. 23 depicts an integrated bed optimization system with an upper structure and a drawer, in an extended position with the drawer pulled out.
Figure 24:
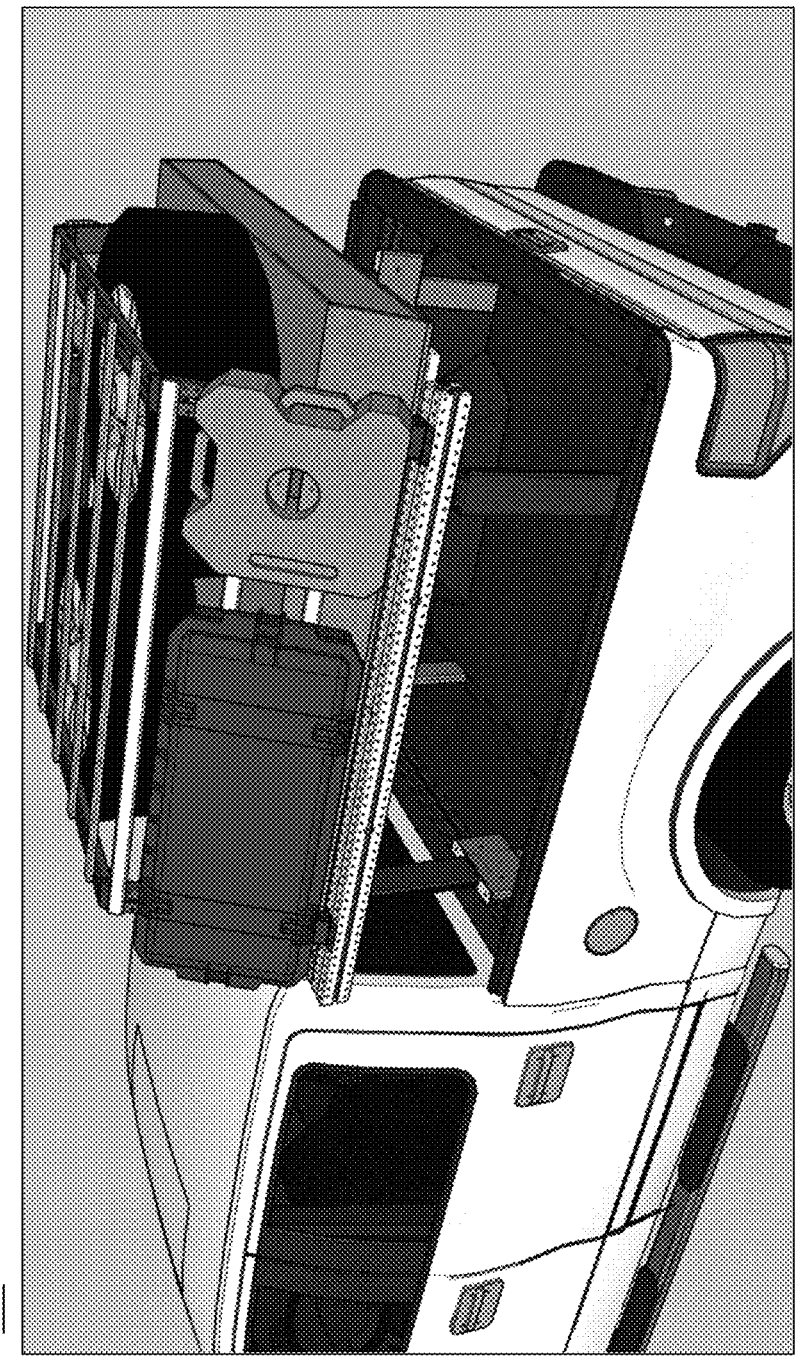
FIG. 24 depicts an integrated bed optimization system with an upper structure, in an extended position.

FIGS. 22-24 depict a configuration particularly suitable for off-roading and adventure activities. Integrated bed optimization system 100 comprises upper structure 2000 (previously described with reference to FIGS. 20 and 21), which allows multiple items to be secured in a manner that is still easy to access. Additionally, external drawer system 2200 has been added for extra storage space. In FIGS. 22-23, integrated bed optimization system 100 is retracted. In FIG. 24, integrated bed optimization system 100 is extended, demonstrating the system's ability to increase usable storage space and improve access to the pickup truck bed.

Additional Detail Regarding Vertical Support Structures 103

FIGS. 25-28 depict additional structural detail for integrated bed optimization system 100.

Figure 25:
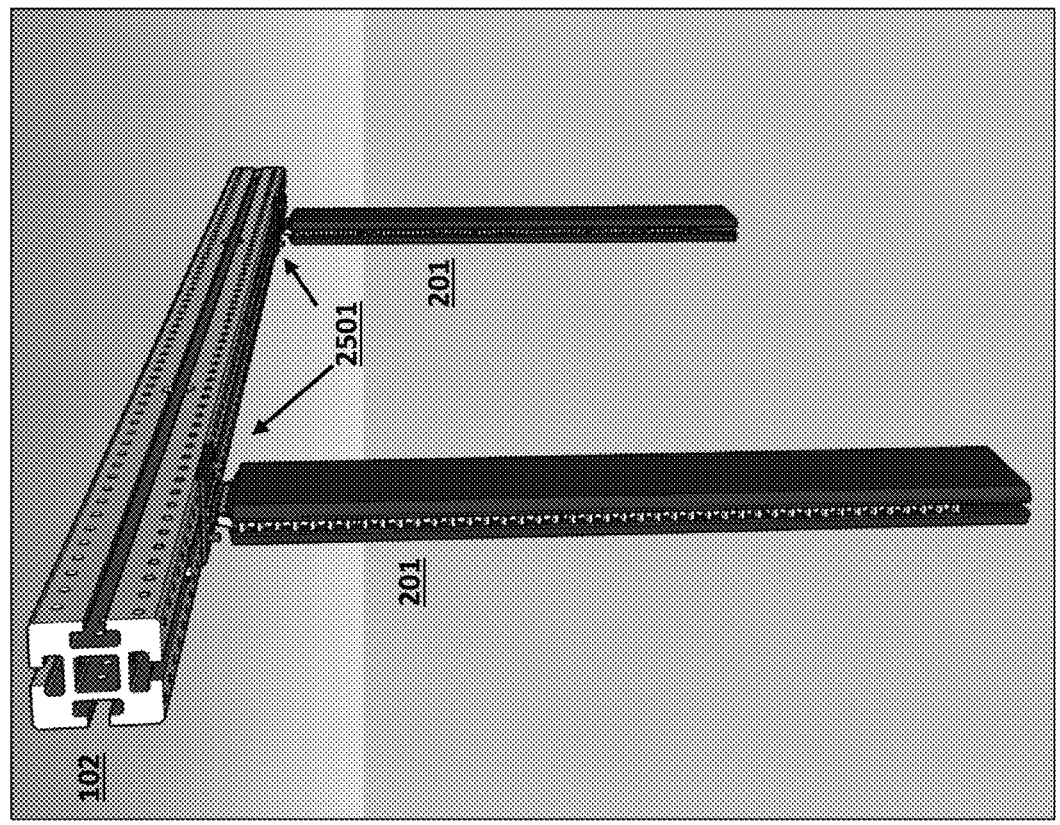
FIG. 25 depicts front vertical support pillars attached to an integrated bed optimization system beam.

FIG. 25 depicts beam 102 mounted to two front vertical pillars 201 using the T-Track system and hinges 2501. Hinges 2501 allow movement between mounting plate 2601 (shown in FIG. 26) secured to beam 102 and the front vertical pillar 201. Hinge 2501 allow frame 101 to tilt on demand, as previously depicted in FIG. 17.

FIG. 26 depicts an exemplary front vertical support pillar 201 with a mounting plate 2601 and hinge 2501. Hinge 2501 allows mounting plate 2601 to tilt forward and backward.

FIG. 27 shows an exploded view of front vertical support pillar 201. Front vertical support pillar 201 comprises side support plates 2701 (preferably made of a light material such as aluminum) surrounding core 2702. Core 2702 comprises racks 2703 on either side which engage with pinions (shown in FIGS. 31-31) in the motor unit 106.

FIG. 28 shows a side vertical support pillar 201 with the sliding and pivoting T-Track mounting plate 2801 on top. This permits frame 101 to tilt forward or backward by up to 20 degrees.

FIG. 29 depicts front vertical support pillar 201 positioned in motor unit 106. Protective sleeve 107 stabilizes the vertical pillar 201 when it is elevated and safeguards it when it is retracted.

Frame 101 is elevated and retracted using electric motors within one or more motor units 106 mounted to the sides of the pickup truck bed 104.

Figure 30:
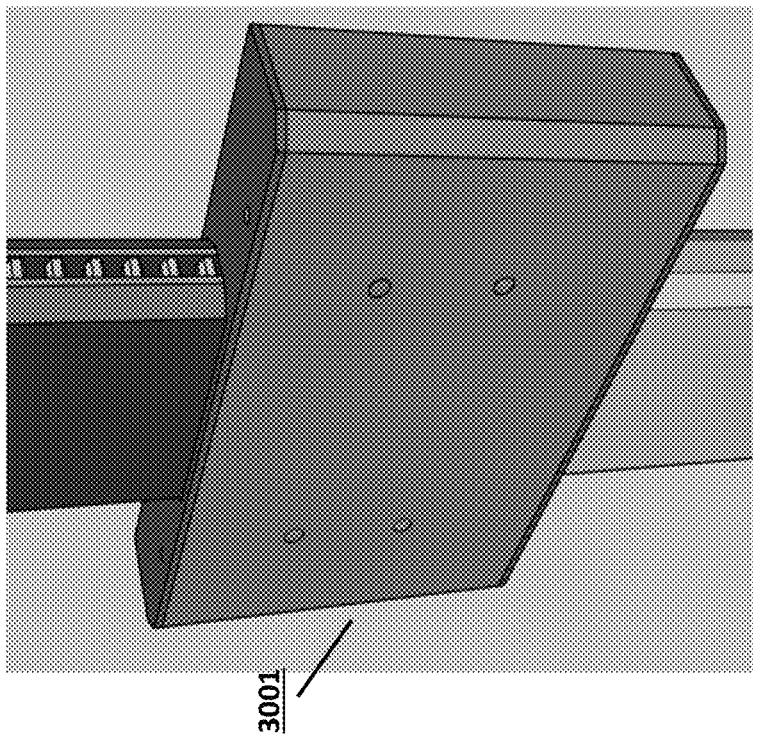
FIG. 30 depicts a motor unit.

FIG. 30 shows the outside of motor unit 106. Motor unit 106 comprises housing 3001.

Figure 31:
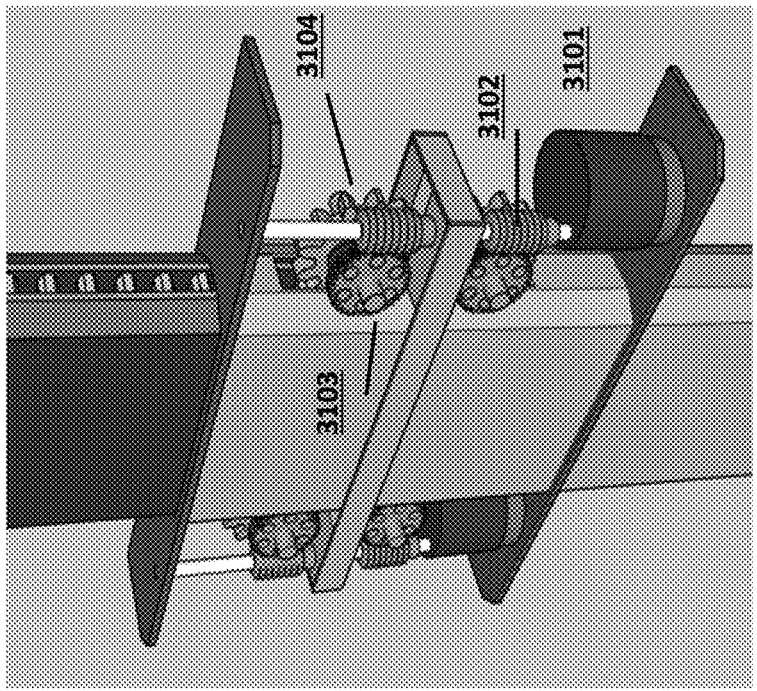
FIG. 31 depicts a motor unit with its outer shell removed.

FIG. 31 depicts motor unit 106 with housing 3001 removed. Various types of motors can be used in motor unit 106. In this embodiment, motor unit 106 comprises electric motors 3101 that drive worm gears 3102, which turn worm wheels 3103, which turn pinions 3104, which engage with racks 2703 (shown in FIG. 27) on the vertical pillar 201 to push it upward or downward.

Figure 33:
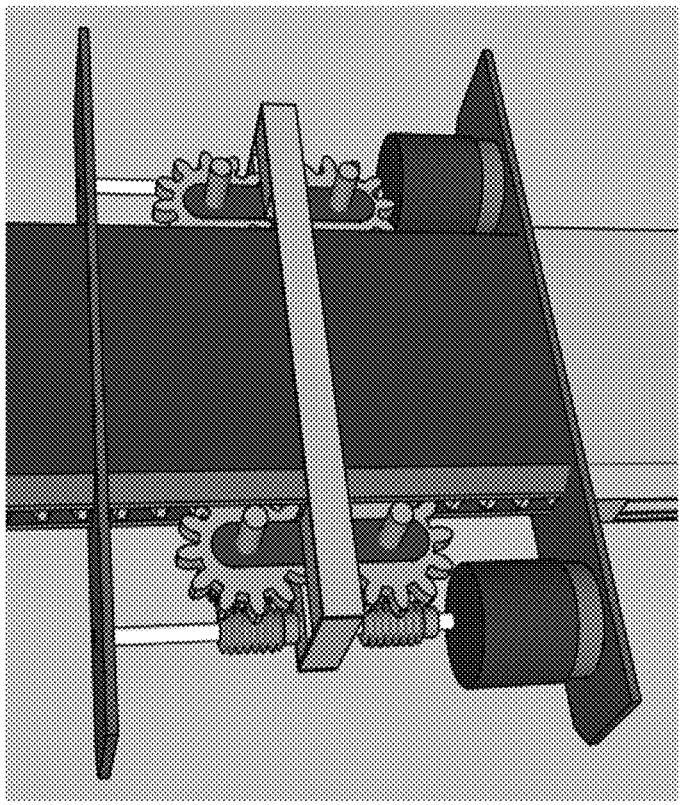
FIG. 33 depicts a motor unit with its outer shell removed.
Figure 32:
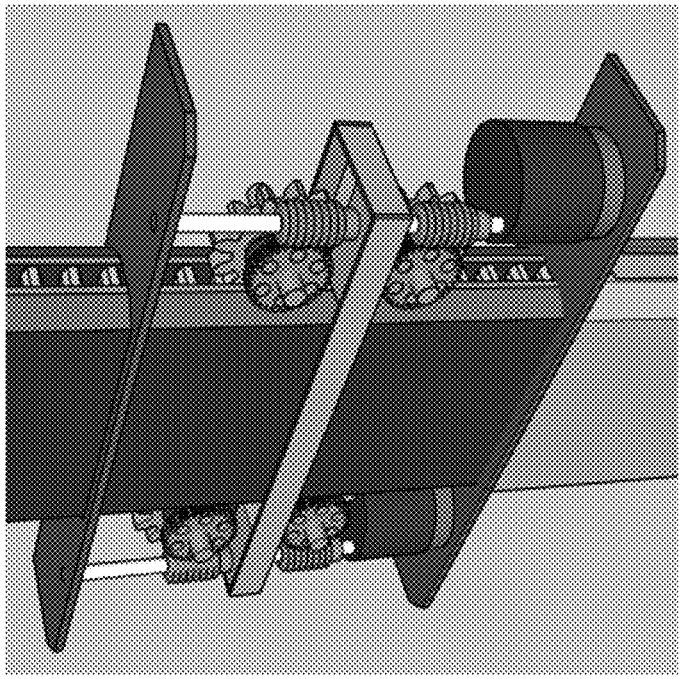
FIG. 32 depicts a motor unit with its outer shell removed.

FIGS. 32-33 show motor unit 106 with housing 3001 removed and with part of protective support sleeve 107 removed to provide additional views of the components of motor unit 106.

Figure 36:
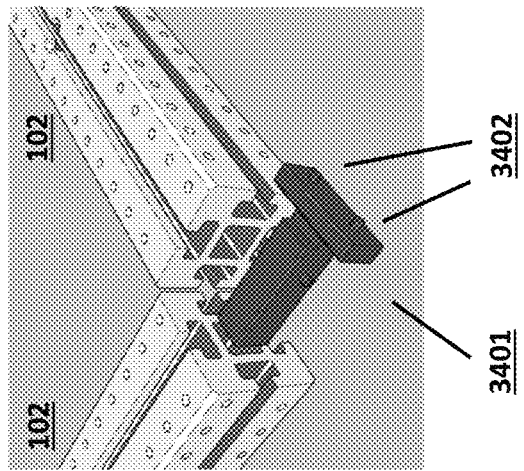

With reference to FIGS. 34 to 36, beams 102 are connected to one another utilizing 90-degree connecting lugs 3401 which fit into the center of the front beam 102 and into the inner T-Track slot 301 of the side beams 102. Lug 3401 comprises spring loaded pins 3402 which align with holes 401 in beams 102 to secure lugs 3401 and beams 102 in place.

Figure 37:
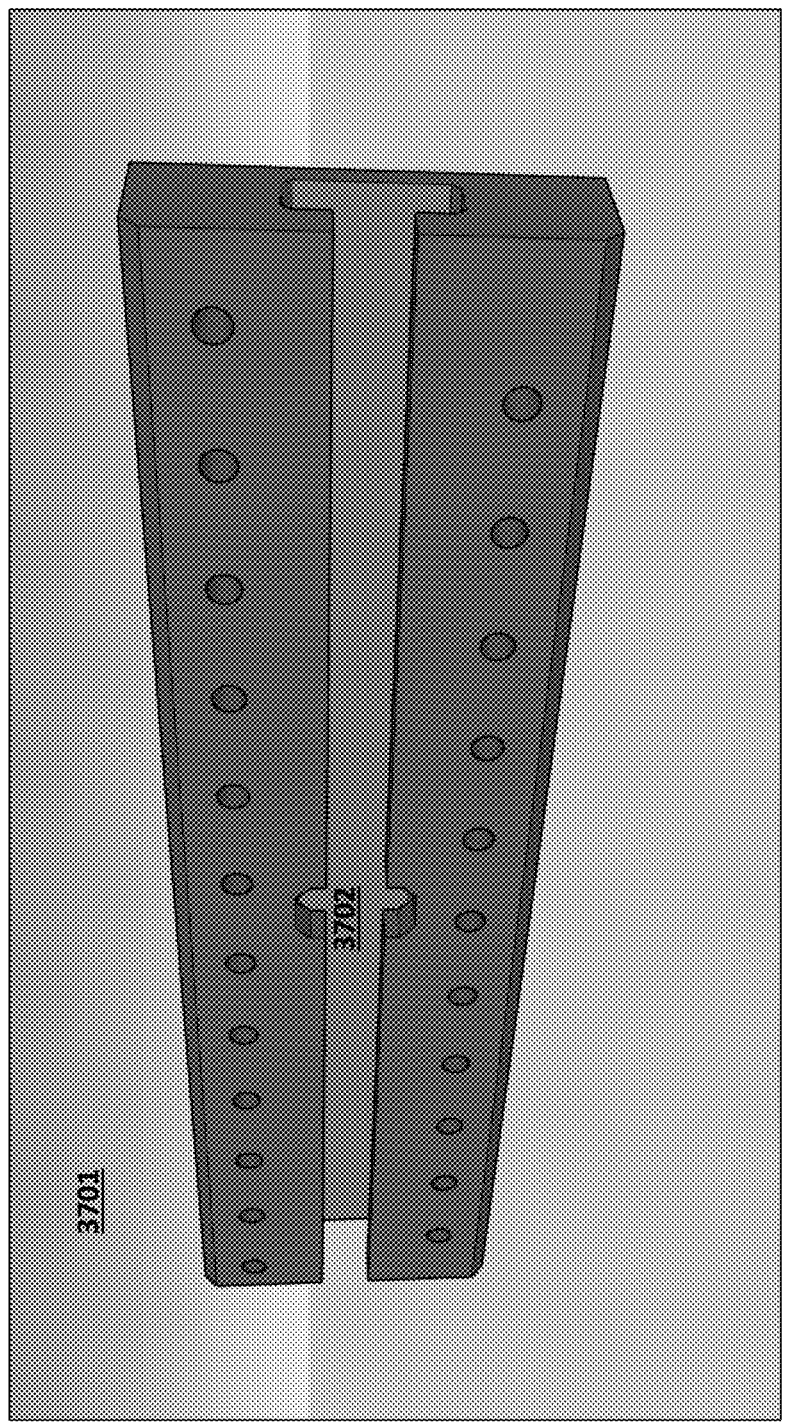
FIG. 37 depicts a support structure 3701.

With reference to FIG. 37, integrated bed optimization system 100 optionally comprises T-track support structure 3701, which here comprises single sided T-Track sections, which are attached to the inner sides of pickup truck bed 104, including the tailgate. This ensures the user can attach components at the optimal position. FIG. 37 shows a section of support structure 3701. Cutout 3702 permits male T-Track lugs 3401 to be placed within the slot.

Figure 38:
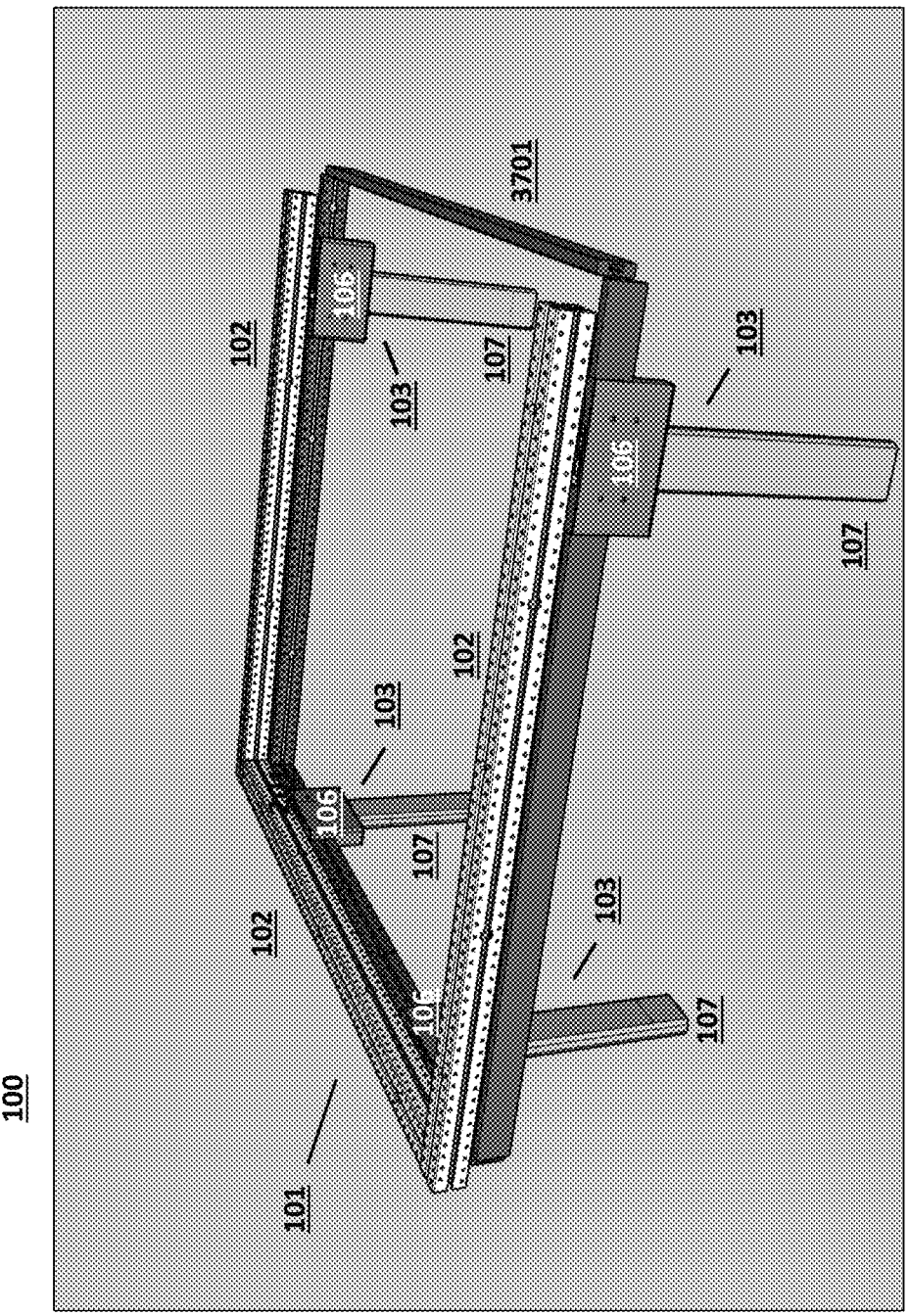
FIG. 38 depicts an integrated bed optimization system in a retracted position.
Figure 39:
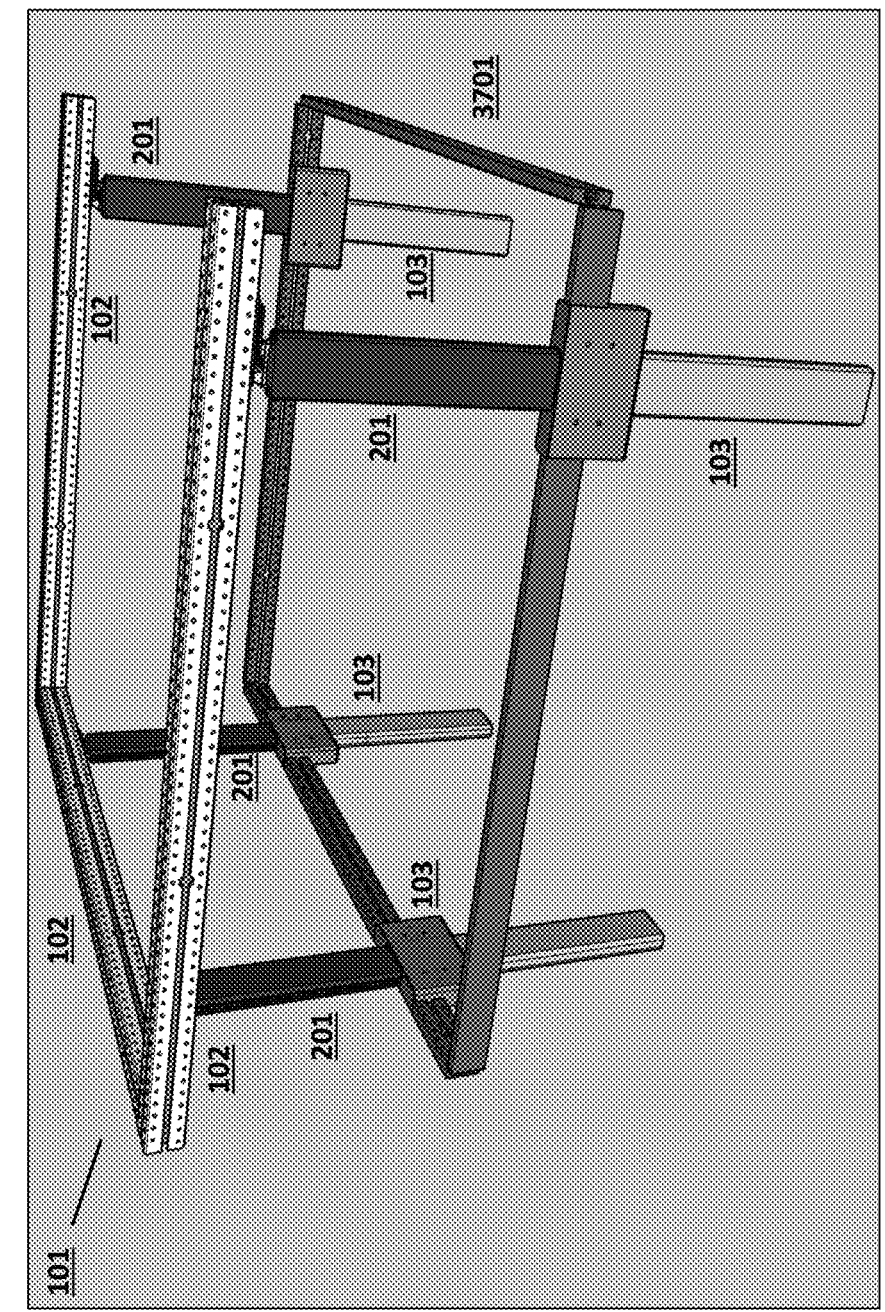
FIG. 39 depicts an integrated bed optimization system in an extended position.

FIGS. 38 and 39 depict integrated bed optimization system 100 separated from pickup truck bed 104. As in previous figures, integrated bed optimization system 100 comprises frame 101 (comprising beams 102), vertical support structures 103 (comprising vertical pillars 201, motor units 106, and support sleeves 107). Vertical support structures 103 are attached to T-track support structure 3701. T-track support structure 3701 is secured to truck bed 104 when integrated bed optimization system 100 is installed in truck 105.

Optionally, support sleeves 107 can protrude below the floor of pickup truck bed 104 to permit vertical pillars 201 to retract low enough for frame 101 to be flush with the top of pickup truck bed 104 when integrated bed optimization system 100 is retracted, while also being long enough to permit frame 101 to elevate above the top of pickup truck cab 202 (as shown in FIG. 2).

Figure 40:
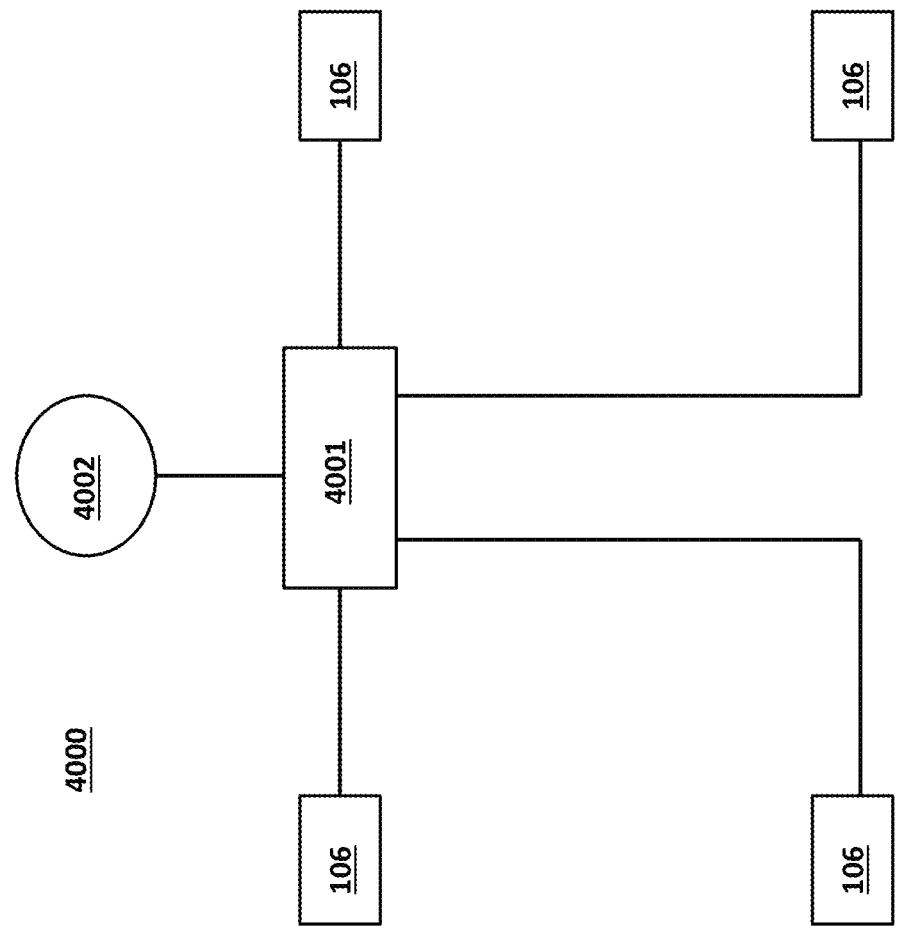
FIG. 40 depicts a control system for an integrated bed optimization system.

FIG. 40 depicts control system 4000. Control system 4000 comprises controller 4001 coupled to motor units 106. Controller 4001 receives commands from user interface

4002. Controller 4001 controls the operation of each motor unit 106 to cause the motor to retract or extend the attached vertical pillar 201 (not shown). User interface 4002 receives commands from a user to extend or retract one or more of the vertical pillars 201. User interface 4002 can comprise physical buttons and/or a graphical user interface located within pickup truck 105 (such as in truck bed 104, on the console, or on the key fob), or it can comprise an app on a smartphone that receives commands through a graphical user interface or voice recognition, or it can comprise other known user interface mechanisms. User interface 4002 optionally can provide individual controls for each vertical pillar 201 and/or controls for groups of vertical pillars 201 (such as all four vertical pillars, the two front vertical pillars, the two back vertical pillars, the two pillars on the driver's side, the two pillars on the passenger's side, etc.).

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. An integrated bed optimization system, comprising:
 a frame, wherein the frame comprises a plurality of A-frames, each A-frame comprising a plurality of beams, wherein each beam comprises a T-track mounting slot on one or more sides of the beam; and
 a plurality of vertical support structures coupled to the frame, each of the plurality of vertical support structures comprising:
  a vertical pillar;
  a support sleeve; and
  a motor unit for extending the vertical pillar out of the sleeve to raise the frame and for retracting the vertical pillar into the sleeve to lower the frame.

2. The system of claim 1, wherein the frame comprises a second plurality of beams arranged in a U-configuration.

3. The system of claim 2, wherein each of the second plurality of beams comprises a T-track mounting slot on one or more sides of the beam.

4. The system of claim 3, further comprising one or more tiedown attachments secured within a T-track mounting slot of a beam.

5. The system of claim 3, further comprising rail top covers attached to the top side of the frame.

6. The system of claim 3, further comprising a tonneau cover attached to the frame.

7. The system of claim 6, further comprising side skirts attached to the frame.

8. The system of claim 3, further comprising a camper shell attached to the frame.

9. The system of claim 8, further comprising side skirts attached to the frame.

10. The system of claim 1, wherein each of the plurality of vertical support structures can extend and retract independently of one another.

11. The system of claim 1, further comprising a drawer attached to the frame.

12. A pickup truck comprising an integrated bed optimization system, the truck comprising:
 a pickup truck bed;
 a frame, wherein the frame comprises a plurality of A-frames, each A-frame comprising a plurality of beams, wherein each beam comprises a T-track mounting slot on one or more sides of the beam; and
 a plurality of vertical support structures, each of the plurality of vertical support structures comprising:
  a vertical pillar secured to the frame;
  a support sleeve secured to the pickup truck bed; and
  a motor unit for extending the pillar out of the sleeve to raise the frame and for retracting the pillar into the sleeve to lower the frame.

13. The truck of claim 12, wherein the frame comprises a second plurality of beams arranged in a U-configuration.

14. The truck of claim 13, wherein each of the second plurality of beams comprises a T-track mounting slot on one or more sides of the beam.

15. The truck of claim 14, further comprising one or more tiedown attachments secured within a T-track mounting slot of a beam.

16. The truck of claim 14, further comprising rail top covers attached to the top side of the frame.

17. The truck of claim 14, further comprising a tonneau cover attached to the frame.

18. The truck of claim 17, further comprising side skirts attached to the frame.

19. The truck of claim 14, further comprising a camper shell attached to the frame.

20. The truck of claim 19, further comprising side skirts attached to the frame.

21. The truck of claim 12, wherein each of the plurality of vertical support structures can extend and retract independently of one another.

22. The truck of claim 14, further comprising a drawer attached to the frame.

\* \* \* \* \*